(12) United States Patent
Abdelghaffar et al.

(10) Patent No.: US 12,489,579 B2
(45) Date of Patent: Dec. 2, 2025

(54) UPLINK REFERENCE SIGNAL TECHNIQUES FOR NON-CODEBOOK-BASED WIRELESS COMMUNICATIONS

(71) Applicant: QUALCOMM Incorporated, San Diego, CA (US)

(72) Inventors: Muhammad Sayed Khairy Abdelghaffar, San Jose, CA (US); Ahmed Attia Abotabl, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 17/997,235

(22) PCT Filed: Jun. 9, 2021

(86) PCT No.: PCT/US2021/036621
§ 371 (c)(1),
(2) Date: Oct. 26, 2022

(87) PCT Pub. No.: WO2021/252631
PCT Pub. Date: Dec. 16, 2021

(65) Prior Publication Data
US 2023/0188289 A1    Jun. 15, 2023

(30) Foreign Application Priority Data

Jun. 9, 2020   (GR) .............................. 20200100320

(51) Int. Cl.
*H04L 5/00* (2006.01)
*H04B 7/0456* (2017.01)
*H04W 24/08* (2009.01)

(52) U.S. Cl.
CPC ......... *H04L 5/0051* (2013.01); *H04B 7/0456* (2013.01); *H04W 24/08* (2013.01)

(58) Field of Classification Search
CPC ... H04L 5/0051; H04L 5/0007; H04L 5/0094; H04B 7/0456; H04B 7/0404; H04B 17/318; H04B 7/0617; H04W 24/08
See application file for complete search history.

(56) References Cited

U.S. PATENT DOCUMENTS

2019/0372727 A1* 12/2019 Joseph ................ H04L 27/2613
2020/0120656 A1*  4/2020 Zhou ..................... H04B 7/063
(Continued)

FOREIGN PATENT DOCUMENTS

WO    WO-2019140671 A1    7/2019

OTHER PUBLICATIONS

Sony: "Summary of SRS", 3GPP Draft, 3GPP TSG RAN WG1 Meeting #92-Bis, R1-1805678—Summary of SRS V0.4, 3rd Generation Partnership Project (3GPP), Mobile Competence Centre, 650, Route Des Lucioles, F-06921, Sophia-Antipolis Cedex, France, vol. RAN WG1, No. Sanya, China, Apr. 16, 2018-Apr. 20, 2018, Apr. 19, 2018 (Apr. 19, 2018), 49 pages.

(Continued)

*Primary Examiner* — Benjamin H Elliott, IV
(74) *Attorney, Agent, or Firm* — Holland & Hart LLP

(57) ABSTRACT

Methods, systems, and devices for wireless communications are described for systems that use resource bandwidths within one or more bandwidth parts (BWPs). Such resource bandwidths may be configured in one or more BWPs to support relatively fast switching and allow enhanced flexibility for communications within a BWP. Within one or more BWPs, downlink reference signal resources of a first resource bandwidth may be associated with one or multiple uplink resources of a second resource bandwidth, and pre- (Continued)

coding for uplink communications in the one or multiple uplink resources may be calculated based on the associated downlink reference signal resources. Additionally or alternatively, abeam used for uplink communications may be provided to the UE in transmission control information (TCI). Further, in some cases, multiple disjoint subsets of uplink frequency resources within a resource bandwidth may use different beams, according to an indication provided in TCI.

28 Claims, 23 Drawing Sheets

(56) References Cited

U.S. PATENT DOCUMENTS

| | | | | |
|---|---|---|---|---|
| 2021/0099981 | A1* | 4/2021 | Cirik | H04W 72/23 |
| 2021/0105751 | A1* | 4/2021 | Xu | H04B 7/0456 |
| 2021/0105783 | A1* | 4/2021 | Wang | H04L 5/0094 |
| 2021/0152397 | A1* | 5/2021 | Jiang | H04L 5/0048 |
| 2021/0184812 | A1* | 6/2021 | MolavianJazi | H04L 1/0045 |
| 2021/0392532 | A1* | 12/2021 | Wu | H04L 5/0094 |
| 2022/0104031 | A1* | 3/2022 | Matsumura | H04W 72/23 |
| 2022/0209920 | A1* | 6/2022 | Wu | H04W 52/0225 |
| 2022/0216929 | A1* | 7/2022 | Matsumura | H04L 5/0023 |
| 2022/0224470 | A1* | 7/2022 | Matsumura | H04B 7/0404 |
| 2022/0225120 | A1* | 7/2022 | Matsumura | H04L 5/0023 |
| 2022/0321292 | A1* | 10/2022 | Matsumura | H04L 5/0048 |
| 2022/0386363 | A1* | 12/2022 | Ying | H04L 1/1896 |
| 2023/0025072 | A1* | 1/2023 | Yuan | H04W 72/231 |
| 2023/0028861 | A1* | 1/2023 | Yao | H04W 52/54 |
| 2023/0087394 | A1* | 3/2023 | Yuan | H04W 72/23 370/329 |
| 2023/0127256 | A1* | 4/2023 | Cha | H04W 52/242 370/318 |
| 2023/0171771 | A1* | 6/2023 | Guo | H04W 16/28 370/329 |
| 2023/0188289 | A1* | 6/2023 | Abdelghaffar | H04W 24/08 370/252 |
| 2023/0209538 | A1* | 6/2023 | Cirik | H04W 72/231 370/329 |

OTHER PUBLICATIONS

Intel Corporation: "Remaining Issues on Multi-Antenna Scheme," 3GPP Draft, 3GPP TSG RAN WG1 Meeting #94b, R1-1810749, Remaining Issues on Multi Antenna Scheme, 3rd Generation Partnership Project (3GPP), Mobile Competence Centre, 650, Route Des Lucioles, F-06921, Sophia-Antipolis Cedex, France, vol. RAN WG1. No. Chengdu, China, Oct. 8, 2018-Oct. 12, 2018, Sep. 29, 2018 (Sep. 29, 2018), XP051518153, 4 pages, section 2.2, p. 2-p. 3.
International Search Report and Written Opinion—PCT/US2021/036621—ISA/EPO—Sep. 29, 2021.
Lenovo, et al., "Maintenance for Codebook and Non-Codebook Based UL Transmission," 3GPP Draft, 3GPP TSG RAN WG1 Meeting #94, R1-1808549, 3rd Generation Partnership Project (3GPP), Mobile Competence Centre, 650, Route Des Lucioles, F-06921, Sophia-Antipolis Cedex, France, vol. RAN WG1. No. Goteborg, Sweden, Aug. 20, 2018-Aug. 24, 2018, Aug. 10, 2018 (Aug. 10, 2018), XP051515926, 6 pages, section 2.2, p. 2 section 2.3, p. 3.
Sony: "Summary of SRS", 3GPP Draft, 3GPP TSG RAN WG1 Meeting #92-Bis, R1-1805678—Summary of SRS V0.4, 3rd Generation Partnership Project (3GPP), Mobile Competence Centre, 650, Route Des Lucioles, F-06921, Sophia-Antipolis Cedex, France, vol. RAN WG1, No. Sanya, China, Apr. 16, 2018-Apr. 20, 2018, Apr. 19, 2018 (Apr. 19, 2018), 49 pages, XP051427804, p. 25-p. 27, p. 32.

* cited by examiner

UPLINK REFERENCE SIGNAL TECHNIQUES FOR NON-CODEBOOK-BASED WIRELESS COMMUNICATIONS

CROSS REFERENCE

The present Application is a 371 national stage filing of International PCT Application No. PCT/US2021/036621 by ABDELGHAFFAR et al. entitled "UPLINK REFERENCE SIGNAL TECHNIQUES FOR NON-CODEBOOK-BASED WIRELESS COMMUNICATIONS," filed Jun. 9, 2021; and claims priority to Greece Provisional Patent Application No. 20200100320 by ABDELGHAFFAR et al., entitled "UPLINK REFERENCE SIGNAL TECHNIQUES FOR NON-CODEBOOK-BASED WIRELESS COMMUNICATIONS," filed Jun. 9, 2020; each of which is assigned to the assignee hereof, and each of which is expressly incorporated by reference in its entirety herein.

FIELD OF TECHNOLOGY

The following relates generally to wireless communications and more specifically to uplink reference signal techniques for non-codebook-based wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may include communication devices, such as UEs and base stations that may support duplex communications, such as half-duplex communications and full-duplex communications. The UEs and the base stations may also support various bandwidth parts (BWPs) for half-duplex communications and full-duplex communications. The UEs and the base stations may, in some cases, also experience latency with the duplex communications as a result of switching BWPs. As demand for communication efficiency increases, it may be desirable for the UEs and the base stations to provide improvements to BWP operations to support enhanced reliability and reduced latency duplex communications.

SUMMARY

Various aspects of the described techniques relate to configuring a communication device, such as a user equipment (UE), to support duplex communications over one or multiple resource bandwidths within one or multiple bandwidth parts (BWPs) of a total available channel bandwidth. A BWP may be a portion of a radio frequency spectrum band that the UE may use for downlink communications, or uplink communications, or both. In some cases, the UE may be configured with one or multiple resource bandwidths within a BWP, where a downlink reference signal resource of a first resource bandwidth may be associated with one or multiple uplink reference signal resources of one or multiple different resource bandwidths. A UE may receive a downlink reference signal (e.g., a channel state information reference signal (CSI-RS)) in the first resource bandwidth, and calculate precoding parameters for an uplink reference signal (e.g., a sounding reference signal (SRS)) in a first uplink reference resource of a second resource bandwidth. In some cases, the uplink communications in the second resource bandwidth may be transmitted using a spatial domain transmission filter that is indicated to the UE in transmission control information (TCI). The described techniques may, as a result, include features for improvements to resource bandwidth and BWP operations when determining precoding at the UE for uplink communications and, in some examples, may promote high reliability and low latency duplex communications, among other benefits.

A method of wireless communication at a UE is described. The method may include measuring a downlink reference signal from a base station in a first resource bandwidth of a first bandwidth part of a channel bandwidth for communications between the UE and the base station, calculating, based on the measuring, precoding parameters for an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, and transmitting the uplink reference signal using the calculated precoding parameters in each of the one or more reference signal resource sets in the second resource bandwidth of the first bandwidth part.

An apparatus for wireless communication at a UE is described. The apparatus may include a processor, memory coupled with the processor, and instructions stored in the memory. The instructions may be executable by the processor to cause the apparatus to measure a downlink reference signal from a base station in a first resource bandwidth of a first bandwidth part of a channel bandwidth for communications between the UE and the base station, calculate, based on the measuring, precoding parameters for an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, and transmit the uplink reference signal using the calculated precoding parameters in each of the one or more reference signal resource sets in the second resource bandwidth of the first bandwidth part.

Another apparatus for wireless communication at a UE is described. The apparatus may include means for measuring a downlink reference signal from a base station in a first resource bandwidth of a first bandwidth part of a channel bandwidth for communications between the UE and the base station, calculating, based on the measuring, precoding parameters for an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, and transmitting the uplink reference signal using the calculated precoding parameters in each of the one or more reference signal resource sets in the second resource bandwidth of the first bandwidth part.

A non-transitory computer-readable medium storing code for wireless communication at a UE is described. The code may include instructions executable by a processor to measure a downlink reference signal from a base station in a first resource bandwidth of a first bandwidth part of a channel bandwidth for communications between the UE and the base station, calculate, based on the measuring, precoding parameters for an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, and transmit the uplink reference signal using the calculated precoding parameters in each of the one or more reference signal resource sets in the second resource bandwidth of the first bandwidth part.

In some examples of the method, apparatuses, and non-transitory computer-readable medium described herein, the measuring further may include operations, features, means, or instructions for measuring the downlink reference signal in contiguous or non-contiguous frequency domain resources within the first resource bandwidth. In some examples of the method, apparatuses, and non-transitory computer-readable medium described herein, the one or more reference signal resource sets fully or partially overlap frequency domain resources of the downlink reference signal. Some examples of the method, apparatuses, and non-transitory computer-readable medium described herein may further include operations, features, means, or instructions for transmitting an uplink shared channel communication associated with the uplink reference signal in the second resource bandwidth.

Some examples of the method, apparatuses, and non-transitory computer-readable medium described herein may further include operations, features, means, or instructions for receiving, from the base station, an uplink grant that includes an indication of the one or more reference signal resource sets in the second resource bandwidth, an indication of an index value associated with the second resource bandwidth, and uplink shared channel information for the second resource bandwidth. In some examples of the method, apparatuses, and non-transitory computer-readable medium described herein, the indication of the one or more reference signal resource sets indicates SRS resources that are defined within the second resource bandwidth. In some examples of the method, apparatuses, and non-transitory computer-readable medium described herein, a number of uplink reference signal resource sets within the second resource bandwidth are indicated by the uplink grant, and where the indication of the one or more reference signal resource sets is provided in a bit field that has separate bits to indicate each uplink reference signal resource set, or in a bit field that indicates each uplink reference signal resource set spans a same amount of resources.

Some examples of the method, apparatuses, and non-transitory computer-readable medium described herein may further include operations, features, means, or instructions for receiving, from the base station, an uplink grant that includes an indication of the one or more reference signal resource sets in the second resource bandwidth, an indication of a first index value associated with the second resource bandwidth, and uplink shared channel information for a third resource bandwidth that is different than the second resource bandwidth. In some examples of the method, apparatuses, and non-transitory computer-readable medium described herein, the uplink grant provides the first index value associated with the second resource bandwidth for the one or more reference signal resource sets and a second index value associated with the third resource bandwidth. In some examples of the method, apparatuses, and non-transitory computer-readable medium described herein, the first index value is mapped to the one or more reference signal resource sets of the second resource bandwidth. In some examples of the method, apparatuses, and non-transitory computer-readable medium described herein, the uplink shared channel communication and the uplink reference signal have fully or partially overlapping frequency domain resources. In some examples of the method, apparatuses, and non-transitory computer-readable medium described herein, the second resource bandwidth and the third resource bandwidth is in a same bandwidth part of the channel bandwidth.

In some examples of the method, apparatuses, and non-transitory computer-readable medium described herein, a number of uplink reference signal resource sets within the second resource bandwidth are indicated by the uplink grant, and where the indication of the one or more reference signal resource sets is provided in a bit field that has separate bits to indicate each uplink reference signal resource set, or in a bit field that indicates each uplink reference signal resource set spans a same amount of resources. In some examples of the method, apparatuses, and non-transitory computer-readable medium described herein, an uplink grant provides separate resource bandwidth indices for the uplink shared channel communication and the uplink reference signal.

In some examples of the method, apparatuses, and non-transitory computer-readable medium described herein, the uplink grant includes separate indications for each of the separate resource bandwidth indices, or an index value that is mapped to a configured table that provides the separate resource bandwidth indices for the uplink shared channel communication and the uplink reference signal. In some examples of the method, apparatuses, and non-transitory computer-readable medium described herein, an uplink grant provides separate reference signal resources for each of the one or more reference signal resource sets. In some examples of the method, apparatuses, and non-transitory computer-readable medium described herein, an uplink grant includes separate indications for each reference signal resource set, or an index value that is mapped to a configured table that provides different combinations of reference signal resources for each uplink reference signal resource set.

A method of wireless communication at a UE is described. The method may include receiving, from a base station, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, calculating, based on a downlink reference signal received from the base station, precoding parameters for the first uplink reference signal and the first uplink shared channel communication, and transmitting the first uplink reference signal and the first uplink shared channel communication using the calculated precoding parameters and the associated spatial domain parameters.

An apparatus for wireless communication at a UE is described. The apparatus may include a processor, memory coupled with the processor, and instructions stored in the memory. The instructions may be executable by the processor to cause the apparatus to receive, from a base station, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, calculate, based on a downlink reference signal received from the base station, precoding parameters for the first uplink reference signal and the first uplink shared channel communication, and transmit the first uplink reference signal and the first uplink shared channel communication using the calculated precoding parameters and the associated spatial domain parameters.

Another apparatus for wireless communication at a UE is described. The apparatus may include means for receiving, from a base station, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, calculating, based on a downlink reference signal received from the base station, precoding parameters for the first uplink reference signal and the first uplink shared channel communication, and transmitting the first uplink reference signal and the first uplink shared channel communication using the calculated precoding parameters and the associated spatial domain parameters.

A non-transitory computer-readable medium storing code for wireless communication at a UE is described. The code may include instructions executable by a processor to receive, from a base station, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, calculate, based on a downlink reference signal received from the base station, precoding parameters for the first uplink reference signal and the first uplink shared channel communication, and transmit the first uplink reference signal and the first uplink shared channel communication using the calculated precoding parameters and the associated spatial domain parameters.

In some examples of the method, apparatuses, and non-transitory computer-readable medium described herein, the uplink transmission control information indicates a first set of spatial domain parameters the first uplink reference signal and a second set of spatial domain parameters for the first uplink shared channel communication that are provided as separate indications for each set of spatial domain parameters, or are provided in an index value that is mapped to a configured table that indicates different sets of spatial domain parameters.

Some examples of the method, apparatuses, and non-transitory computer-readable medium described herein, resources for the first uplink shared channel communication occupy non-contiguous frequency resources within the first resource bandwidth or the second resource bandwidth, and separate spatial domain parameters are used for different portions of the non-contiguous frequency resources. In some examples of the method, apparatuses, and non-transitory computer-readable medium described herein, the downlink reference signal occupies contiguous or non-contiguous frequency domain resources within the first resource bandwidth. In some examples of the method, apparatuses, and non-transitory computer-readable medium described herein, the first uplink reference signal fully or partially overlaps frequency domain resources of the downlink reference signal.

A method of wireless communication at a base station is described. The method may include configuring a UE to transmit uplink communications based on calculated precoding parameters from measurements of a downlink reference signal in a first resource bandwidth of a first bandwidth part of a channel bandwidth, where the uplink communications include an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, transmitting the downlink reference signal to the UE in the first resource bandwidth, and receiving the uplink reference signal from the UE in each of the one or more reference signal resource sets in the second resource bandwidth of the first bandwidth part.

An apparatus for wireless communication at a base station is described. The apparatus may include a processor, memory coupled with the processor, and instructions stored in the memory. The instructions may be executable by the processor to cause the apparatus to configure a UE to transmit uplink communications based on calculated precoding parameters from measurements of a downlink reference signal in a first resource bandwidth of a first bandwidth part of a channel bandwidth, where the uplink communications include an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, transmit the downlink reference signal to the UE in the first resource bandwidth, and receive the uplink reference signal from the UE in each of the one or more reference signal resource sets in the second resource bandwidth of the first bandwidth part.

Another apparatus for wireless communication at a base station is described. The apparatus may include means for configuring a UE to transmit uplink communications based on calculated precoding parameters from measurements of a downlink reference signal in a first resource bandwidth of a first bandwidth part of a channel bandwidth, where the uplink communications include an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, transmitting the downlink reference signal to the UE in the first resource bandwidth, and receiving the uplink reference signal from the UE in each of the one or more reference signal resource sets in the second resource bandwidth of the first bandwidth part.

A non-transitory computer-readable medium storing code for wireless communication at a base station is described. The code may include instructions executable by a processor to configure a UE to transmit uplink communications based on calculated precoding parameters from measurements of a downlink reference signal in a first resource bandwidth of a first bandwidth part of a channel bandwidth, where the uplink communications include an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, transmit the downlink reference signal to the UE in the first resource bandwidth, and receive the uplink reference signal from the UE in each of the one or more reference signal resource sets in the second resource bandwidth of the first bandwidth part.

In some examples of the method, apparatuses, and non-transitory computer-readable medium described herein, the downlink reference signal is transmitted in contiguous or non-contiguous frequency domain resources within the first resource bandwidth. In some examples of the method, apparatuses, and non-transitory computer-readable medium described herein, the one or more reference signal resource sets fully or partially overlap frequency domain resources of the downlink reference signal. Some examples of the method, apparatuses, and non-transitory computer-readable medium described herein may further include operations, features, means, or instructions for receiving, from the UE, an uplink shared channel communication associated with the uplink reference signal in the second resource bandwidth.

Some examples of the method, apparatuses, and non-transitory computer-readable medium described herein may further include operations, features, means, or instructions for transmitting, to the UE, an uplink grant that includes an indication of the one or more reference signal resource sets in the second resource bandwidth, an indication of an index value associated with the second resource bandwidth, and uplink shared channel information for the second resource bandwidth. In some examples of the method, apparatuses, and non-transitory computer-readable medium described herein, the indication of the one or more reference signal resource sets indicates SRS resources that are defined within the second resource bandwidth. In some examples of the method, apparatuses, and non-transitory computer-readable medium described herein, a number of uplink reference signal resource sets within the second resource bandwidth is indicated by the uplink grant, and where the indication of the one or more reference signal resource sets is provided in a bit field that has separate bits to indicate each uplink reference signal resource set, or in a bit field that indicates each uplink reference signal resource set spans a same amount of resources.

Some examples of the method, apparatuses, and non-transitory computer-readable medium described herein may further include operations, features, means, or instructions for transmitting, to the UE, an uplink grant that includes an indication of the one or more reference signal resource sets in the second resource bandwidth, an indication of a first index value associated with the second resource bandwidth, and uplink shared channel information for a third resource bandwidth that is different than the second resource bandwidth. In some examples of the method, apparatuses, and non-transitory computer-readable medium described herein, the uplink grant provides the first index value associated with the second resource bandwidth for the one or more reference signal resource sets and a second index value associated with the third resource bandwidth. In some examples of the method, apparatuses, and non-transitory computer-readable medium described herein, the first index value is mapped to the one or more reference signal resource sets of the second resource bandwidth. In some examples of the method, apparatuses, and non-transitory computer-readable medium described herein, the uplink shared channel communication and the uplink reference signal have fully or partially overlapping frequency domain resources. In some examples of the method, apparatuses, and non-transitory computer-readable medium described herein, the second resource bandwidth and the third resource bandwidth is in a same bandwidth part of the channel bandwidth.

In some examples of the method, apparatuses, and non-transitory computer-readable medium described herein, a number of uplink reference signal resource sets within the second resource bandwidth is indicated by the uplink grant, and where the indication of the one or more reference signal resource sets is provided in a bit field that has separate bits to indicate each uplink reference signal resource set, or in a bit field that indicates each uplink reference signal resource set spans a same amount of resources.

In some examples of the method, apparatuses, and non-transitory computer-readable medium described herein, an uplink grant provides separate resource bandwidth indices for the uplink shared channel communication and the uplink reference signal. In some examples of the method, apparatuses, and non-transitory computer-readable medium described herein, the uplink grant includes separate indications for each of the separate resource bandwidth indices, or an index value that is mapped to a configured table that provides the separate resource bandwidth indices for the uplink shared channel communication and the uplink reference signal. In some examples of the method, apparatuses, and non-transitory computer-readable medium described herein, an uplink grant provides separate reference signal resources for each of the one or more reference signal resource sets. In some examples of the method, apparatuses, and non-transitory computer-readable medium described herein, an uplink grant includes separate indications for each reference signal resource set, or an index value that is mapped to a configured table that provides different combinations of reference signal resources for each uplink reference signal resource set.

A method of wireless communication at a base station is described. The method may include transmitting, to a UE, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, transmitting a downlink reference signal to the UE for calculation of precoding parameters for the first uplink reference signal and the first uplink shared channel communication, and receiving the first uplink reference signal and the first uplink shared channel communication using the associated spatial domain parameters.

An apparatus for wireless communication at a base station is described. The apparatus may include a processor, memory coupled with the processor, and instructions stored in the memory. The instructions may be executable by the processor to cause the apparatus to transmit, to a UE, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, transmit a downlink reference signal to the UE for calculation of precoding parameters for the first uplink reference signal and the first uplink shared channel communication, and receive the first uplink reference signal and the first uplink shared channel communication using the associated spatial domain parameters.

Another apparatus for wireless communication at a base station is described. The apparatus may include means for transmitting, to a UE, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, transmitting a downlink reference signal to the UE for calculation of precoding parameters for the first uplink reference signal and the first uplink shared channel communication, and receiving the first uplink reference signal and the first uplink shared channel communication using the associated spatial domain parameters.

A non-transitory computer-readable medium storing code for wireless communication at a base station is described. The code may include instructions executable by a processor to transmit, to a UE, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, transmit a downlink reference signal to the UE for calculation of precoding parameters for the first uplink reference signal and the first uplink shared channel communication, and receive the first uplink reference signal and the first uplink shared channel communication using the associated spatial domain parameters.

In some examples of the method, apparatuses, and non-transitory computer-readable medium described herein, the uplink transmission control information indicates a first set of spatial domain parameters the first uplink reference signal and a second set of spatial domain parameters for the first uplink shared channel communication that are provided as separate indications for each set of spatial domain parameters, or are provided in an index value that is mapped to a configured table that indicates different sets of spatial domain parameters. In some examples of the method, apparatuses, and non-transitory computer-readable medium described herein, resources for the first uplink shared channel communication occupy non-contiguous frequency resources within the first resource bandwidth or the second resource bandwidth, and separate spatial domain parameters are used for different portions of the non-contiguous frequency resources. In some examples of the method, apparatuses, and non-transitory computer-readable medium described herein, the downlink reference signal occupies contiguous or non-contiguous frequency domain resources within the first resource bandwidth. In some examples of the method, apparatuses, and non-transitory computer-readable medium described herein, the first uplink reference signal fully or partially overlaps frequency domain resources of the downlink reference signal.

DETAILED DESCRIPTION

Figure 1:
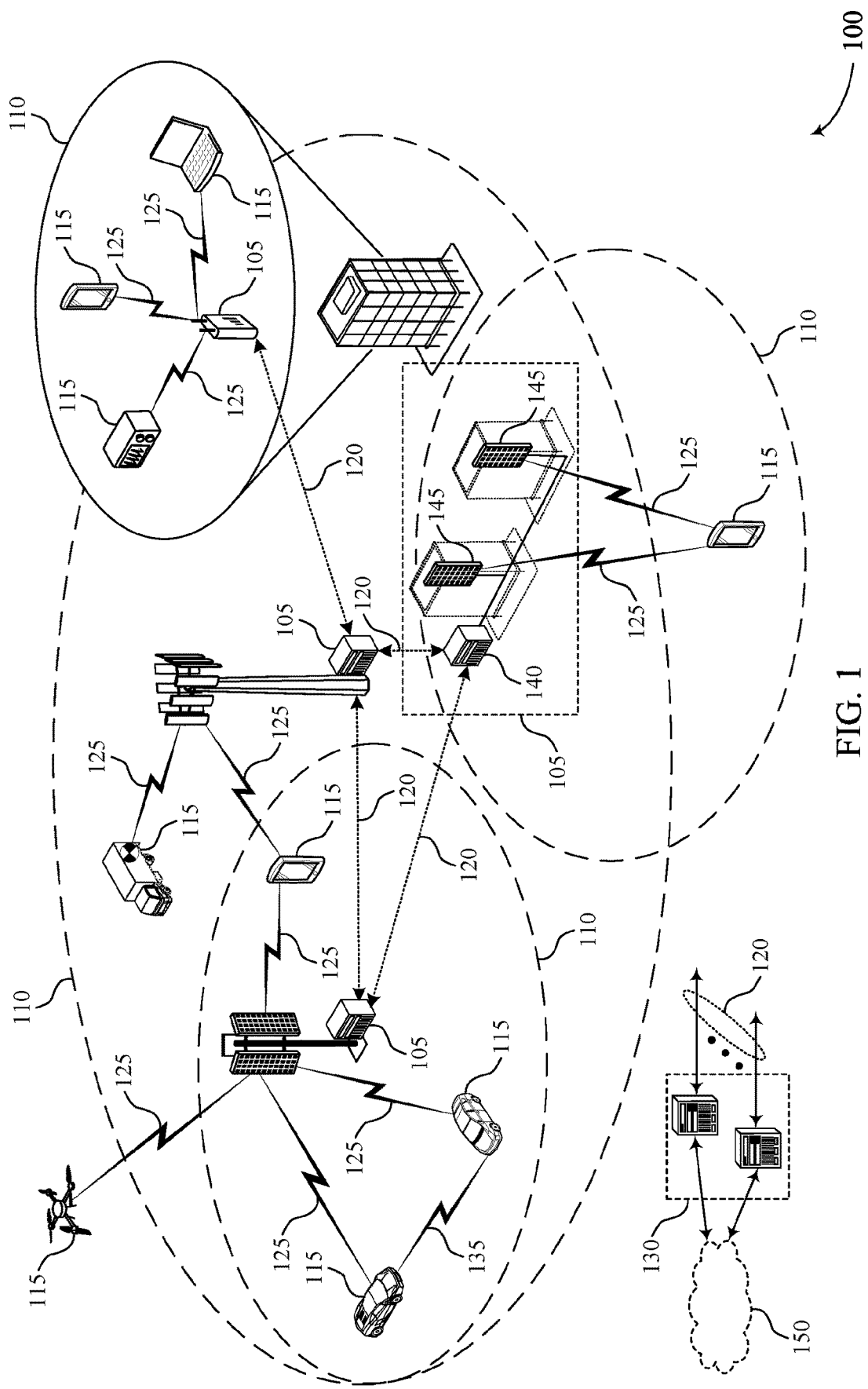
FIG. 1 illustrates an example of a system for wireless communications that supports uplink reference signal techniques for non-codebook-based wireless communications in accordance with aspects of the present disclosure.

Some wireless communications systems may provide for communication between devices, such as a user equipment (UE) and base station, for example. The UE and the base station may support duplex communications, such as half-duplex communications and full-duplex communications. The UE and the base station may also support various bandwidth parts (BWPs) for the half-duplex communications and the full-duplex communications, where each BWP is a portion of an available bandwidth for wireless communications. Each BWP may be a contiguous set of resources in the frequency domain that is configured via radio resource control (RRC) signaling, and thus BWP switching is a relatively slow process that is associated with RRC reconfiguration of BWPs, which may take a relatively long time to complete (e.g., due to signaling associated with RRC configuration/reconfiguration and associated communications between the UE and the base station).

In accordance with techniques as discussed herein, a UE may be configured with a BWP that includes one or multiple resource bandwidths within one or more BWPs. Each resource bandwidth may span an entire BWP, or a portion of a BWP. Further, a resource bandwidth may be non-contiguous in the frequency domain within a configured BWP. A resource bandwidth may also be referred to as a sub-bandwidth part or sub-BWP. In some cases, a UE may be configured to receive a BWP configuration defining a set of resource bandwidths for one or multiple BWPs. Each resource bandwidth may define time and frequency resources for one or multiple BWPs allocated for downlink communications or uplink communications. The BWP configuration may include downlink reference signal resources (e.g., for a channel state information reference signal (CSI-RS)) for a first resource bandwidth, and the UE may measure the CSI-RS and use the measurements to calculate precoding that is to be applied to one or more uplink communications in a second resource bandwidth. Such UE calculation of precoding may provide digital beamforming to uplink transmissions that may enhance the likelihood of successful reception of the uplink communications at the base station. Cases where the UE performs such precoding calculations may be referred to as non-codebook based uplink communication (e.g., non-codebook PUSCH, as opposed to codebook-based PUSCH where the UE is provided with a precoding matrix indicator (PMI) that is mapped to a set of precoding parameters in a codebook). Additionally, in some cases, the base station may provide information related to a beam that is to be used for the uplink communication, such as through uplink transmission control information (TCI) that provides information related to a spatial domain transmission filter used for the SRS resource set as well as the scheduled PUSCH. In some cases, the resource bandwidth may include disjoint subsets of frequency resources, and each different disjoint subset may have a different beam (e.g., different TCI).

Aspects of the subject matter described in this disclosure may be implemented to realize one or more of the following potential improvements, among others. The techniques employed by UEs may provide benefits and enhancements to the operation of the UEs to determine precoding when operating using resource bandwidths within a BWP. Further, using downlink reference signal resources within a resource bandwidth that may be different than uplink resources within a different resource bandwidth In some other examples, configuring the UEs to support an initial resource bandwidth for random access communications may provide improvements to power consumption, spectral efficiency, and, in some examples, may promote high reliability and low latency duplex communications, among other benefits.

Aspects of the disclosure are initially described in the context of wireless communications systems. Various examples of resource bandwidths with reference signal resources and UE determination of precoding at then discussed. Aspects of the disclosure are further illustrated by and described with reference to apparatus diagrams, system diagrams, and flowcharts that relate to uplink reference signal techniques for non-codebook-based wireless communications.

FIG. 1 illustrates an example of a wireless communications system 100 that supports uplink reference signal techniques for non-codebook-based wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The wireless communications system 100 may support duplex communications, such as half-duplex communications and full-duplex communications. The wireless communications system 100 may support the duplex communication over various BWPs. The base stations 105 and the UEs 115 may experience interference issues due to the duplex communications, which may impact a reliability and a latency of the wireless communications system 100. The base stations 105 and the UEs 115 may experience a delay in the duplex communications due to a BWP switching by the base stations 105 and the UEs 115. As demand for communication efficiency increases, it may be desirable for the wireless communications system 100 to provide improvements to BWP operations to support high reliability and low latency duplex communications, among other examples.

A UE 115 may receive a BWP configuration defining a set of resource bandwidths for the one or multiple BWPs. Each resource bandwidth (or sub-BWP) may define time and frequency resources associated with the one or multiple BWPs allocated for downlink communications or uplink communications. The resource bandwidths may thus accommodate disjoint bandwidth allocation for duplex communications, such as full-duplex communications supporting both downlink communications and uplink communications. The UE 115 may determine that at least one resource bandwidth in the set is a master resource bandwidth (also referred to as a default resource bandwidth) used for the downlink communications or the uplink communications, or both.

For example, the master resource bandwidth may function as a default resource bandwidth for the UE 115, if the UE 115 does not know (e.g., a base station 105 does not explicitly signal the UE 115 to use a particular resource bandwidth) which resource bandwidth to use for a BWP. The master resource bandwidth may also provide flexibility for the UE 115 when switching BWPs in which the master resource bandwidth becomes an active resource bandwidth, unless the UE 115 is explicitly signaled a particular resource bandwidth. The described techniques may, as a result, include features for improvements to BPW operations when switching BWPs and, in some examples, may promote high reliability and low latency duplex communications over different BWPs in the wireless communications system 100, among other benefits.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, communications between base stations 105 and UEs 115 may be duplex communications in which a UE 115 concurrently transmits and receives communications using a same set of time and frequency resources. As discussed herein, in some cases one or more resource bandwidths may be configured in one or more BWPs to support relatively fast switching and allow enhanced flexibility for such duplex communications. In some cases, within one or more BWPs, downlink reference signal resources of a first resource bandwidth may be associated with one or multiple uplink resources of a second resource bandwidth, and precoding for uplink communications in the one or multiple uplink resources may be calculated based on the associated downlink reference signal resources. Additionally or alternatively, a beam used for uplink communications may be provided to the UE in TCI. Further, in some cases, multiple disjoint subsets of frequency resources within a resource bandwidth may use different beams, according to an indication provided in TCI.

Figure 2:
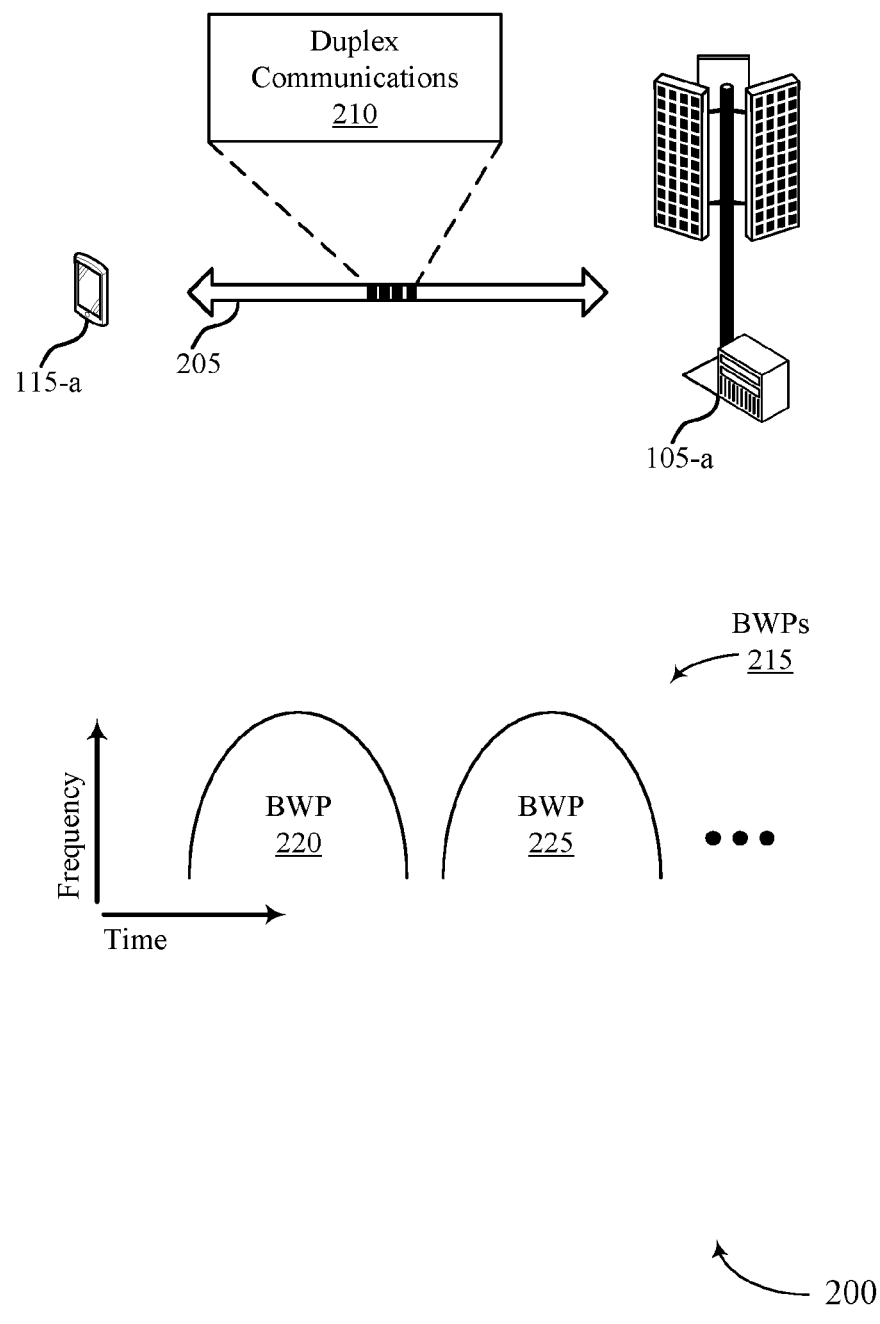
FIG. 2 illustrates an example of a portion of a wireless communications system that supports uplink reference signal techniques for non-codebook-based wireless communications in accordance with aspects of the present disclosure.

FIG. 2 illustrates an example of a wireless communications system 200 that supports uplink reference signal techniques for non-codebook-based wireless communications in accordance with aspects of the present disclosure. In some examples, wireless communications system 200 may implement aspects of wireless communications system 100. For example, the wireless communications system 200 may include a base station 105-a and a UE 115-a, which may be examples of a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems.

The base station 105-a and the UE 115-a may be configured with multiple antennas, which may be used to employ techniques such as transmit diversity, receive diversity, multiple-input multiple-output communications, or beamforming, or any combination thereof. The antennas of the base station 105-a and the UE 115-a may be located within one or more antenna arrays or antenna panels, which may support multiple-input multiple-output operations or transmit or receive beamforming. For example, the base station 105-a antennas or antenna arrays may be co-located at an antenna assembly, such as an antenna tower. In some examples, antennas or antenna arrays associated with the base station 105-a may be located in diverse geographic locations. The base station 105-a may have an antenna array with a number of rows and columns of antenna ports that the base station 105-a may use to support beamforming of communications with the UE 115-a. Likewise, the UE 115-a may have one or more antenna arrays that may support various multiple-input multiple-output or beamforming operations. Additionally or alternatively, an antenna panel may support radio frequency beamforming for a signal transmitted via one or more antenna ports. The base station 105-a and the UE 115-a may thus be configured to support directional communications 205 (e.g., beamformed communications) using the multiple antennas. In some examples, the base station 105-a or the UE 115-a may support duplex communications 210, such as half-duplex communications, or full-duplex communications, or both, via carriers associated with multiple carrier bandwidths over the directional communications 205.

The base station 105-a and the UE 115-a may, in some cases, support subband half-duplex communications or subband full-duplex communications. The base station 105-a and the UE 115-a may support duplex communications using TDD techniques or FDD techniques. The base station 105-a and the UE 115-a may, in some cases, support TDD operations and FDD operations in an unpaired spectrum or a paired spectrum. An unpaired spectrum provides a single subband or a single band for both downlink communications and uplink communications. A paired spectrum provides a distinct subband or band for downlink communications and uplink communications. For example, the wireless communications system 200 may have a block of radio frequency spectrum in a lower frequency band and an associated block of radio frequency spectrum in an upper frequency band.

An arrangement of frequency bands with one band for the uplink communications and one band for the downlink communications may be referred to as paired spectrum. The UE 115-a may be configured for operating over portions of a radio frequency spectrum band (e.g., a bandwidth). For example, the UE 115-a may be configured to operate over one or multiple BWPs 215. In some cases, when the base station 105-a and the UE 115-a are configured with multiple antenna panels, where one antenna panel may be dedicated for downlink communications and another antenna panel may be dedicated for uplink communications in an unpaired spectrum or a paired spectrum, the base station 105-a and the UE 115-a may experience self-interference when communicating over the one or multiple BWPs 215. The self-interference may be a result of simultaneously using multiple antenna panels for uplink communications and downlink communications (e.g., in full-duplex communications) over the one or multiple BWPs 215.

The UE 115-a may be configured to receive a BWP configuration defining a set of resource bandwidths for one or multiple BWPs, such as BWPs 215. Each resource bandwidth may define time and frequency resources for one or multiple BWPs 215 (e.g., a first BWP 220 and a second BWP 225) allocated for duplex communications 210. In some cases, one or more of the BWPs 215 may be configured with multiple resource bandwidths, and downlink reference signal resources of a first resource bandwidth may be associated with one or multiple uplink resources of a second resource bandwidth, and precoding for uplink communications in the one or multiple uplink resources may be calculated based on the associated downlink reference signal resources. Such techniques may provide for enhanced reliability in communications, by allowing precoding to be determined at the UE 115-a for uplink communications that are in different resource bandwidths that at least partially overlap with downlink reference signals in the frequency domain.

Additionally or alternatively, in some cases the UE 115-a may be provided with uplink TCI (e.g., uplink 'spatialRelationInfo') associated with one or more uplink transmit beams. In some prior deployments, for non-codebook based uplink communications, the UE 115-a may not expect to be configured with spatial relation information associated with an uplink beam and with an associated CSI-RS resource in a SRS resource set (e.g., due to the SRS resource set being configured with 'associatedCSI-RS' to calculate the precoding to use for SRS). In such deployments, the UE 115-a may not be able to be separately configured with an uplink beam for each SRS resource. In accordance with various aspects as discussed herein, a transmission uplink TCI may include an indication of a source reference signal to indicate the uplink transmit beam for a target uplink reference signal or channel. Such an indication may provide an indication of one or more spatial domain transmission filters for the SRS resource set(s) as well as the scheduled PUSCH. In cases of disjoint PUSCH on two (or more) subbands, each PUSCH may have its own uplink TCI state. Such techniques may further provide enhanced reliability in communications by allowing spatial relation information to be used for one or more uplink beams, which may enhance the likelihood of successful reception and decoding of associated uplink communications.

Figure 3A:
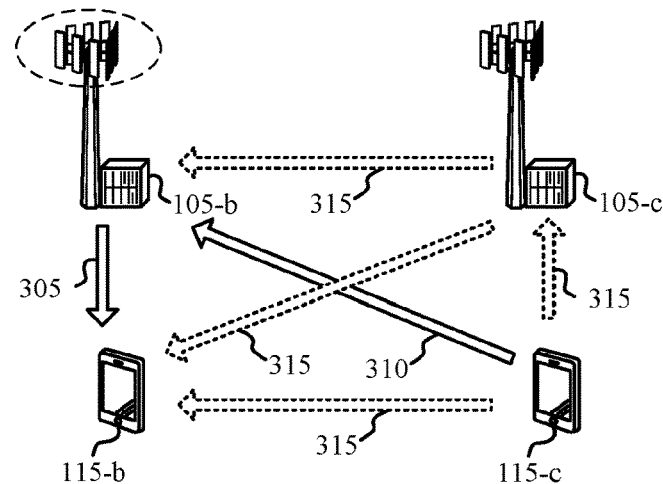
FIGS. 3A through 3C illustrate examples of wireless communications systems that support bandwidth part and resource bandwidth switching in wireless communications in accordance with aspects of the present disclosure.

FIG. 3A illustrates an example of a wireless communications system 300-a that supports uplink reference signal techniques for non-codebook-based wireless communications in accordance with aspects of the present disclosure. In some examples, wireless communications system 300-a may implement aspects of wireless communications system 100 or 200. For example, the wireless communications system 300-a may support duplex communications over resource bandwidths in BWPs. In the example of FIG. 3A, base stations 105-b, 105-c may be configured to support full-duplex communications in the wireless communications system 300-a. For example, the base stations 105-b, 105-c may support full-duplex communications with UEs 115-b, 115-c. The base stations 105-b, 105-c and the UEs 115-b, 115-c may be examples of base stations 105 and UEs 115 described herein.

The UEs 115-b, 115-c may be configured to operate in a half-duplex mode or a full-duplex mode. In the half-duplex mode, the UEs 115-b, 115-c may be configured to either receive downlink communications from the base stations 105-b, 105-c, or transmit uplink communications to the base stations 105-*b*, 105-*c*. In other words, in the half-duplex mode, the UEs 115-*b*, 115-*c* may be unable to jointly receive downlink communications and transmit uplink communications during a same time period using the same frequency resources. In the full-duplex mode, however, the UEs 115-*b*, 115-*c* may be configured to simultaneously receive downlink communications and transmit uplink communications from and to the base stations 105-*b*, 105-*c* during a same time period on a same set of frequency resource. The base station 105-*b*, 105-*c* may provide downlink communications using one or multiple directional beams. Likewise, the UEs 115-*b*, 115-*c* may provide uplink communications using one or multiple directional beams.

With reference to FIG. 3A, the base stations 105-*b*, 105-*c* may operate in a full-duplex mode, while the UEs 115-*b*, 115-*c* operate in a half-duplex mode. In some cases, one or more of the base stations 105-*b*, 105-*c* and the UEs 115-*b*, 115-*c* may experience interference in the wireless communications system 300-*a*. For example, the base station 105-*b* may experience self-interference from downlink communications to uplink communications. By way of example, the base station 105-*b* may transmit downlink communications 305 to the UE 115-*b* using at least one antenna panel of the base station 105-*b*, as well as receive uplink communications 310 from the UE 115-*c* using another antenna panel of the base station 105-*b*. This may cause self-interference at the base station 105-*b* due to, for example, simultaneous transmission of the downlink communications 305 using the at least one antenna panel of the base station 105-*b* and reception of the uplink communications 310 from the UE 115-*c* using another antenna panel of the base station 105-*b*.

The base station 105-*b* may experience some interference communications 315 from the base station 105-*c* that may relate to downlink communications from the base station 105-*c* to the UE 115-*b*, or downlink communications from the base station 105-*c* to the UE 115-*c*. Similarly, the UE 115-*b* may experience some interference communications 315 from the UE 115-*c* that may relate to uplink communications from the UE 115-*c* to the base station 105-*c*. Additionally or alternatively, the base station 105-*c* may experience some interference communications 315 from the UE 115-*c* that may relate to the uplink communications 310 from the UE 115-*c* to the base station 105-*b*. To mitigate the self-interference at the UEs 115-*b*, 115-*b* (or any other UE 115) may use a resource bandwidth of a BWP allocated for uplink communications or downlink communications, or both.

For example, the UEs 115-*b*, 115-*c* may be configured to receive a BWP configuration defining a set of resource bandwidths for one or multiple BWPs. Each resource bandwidth may define time and frequency resources for one or multiple BWPs allocated for duplex communications. Further, to help reduce or eliminate interference, in some cases the UEs 115-*b*, 115-*c* may be configured to receive a BWP configuration defining a set of resource bandwidths for one or multiple BWPs. The UEs 115-*b*, 115-*c* may identify at least one downlink reference signal (e.g., CSI-RS) resource that is associated with one or more sets of uplink reference signal (e.g., SRS) resource sets, one or more uplink data channel (e.g., PUSCH) resources, or combinations thereof. The UEs 115-*b*, 115-*c* may transmit non-codebook based uplink communications by calculating precoding parameters based on reference signal measurements in the downlink reference signal resources, and using the precoding parameters for uplink communications. The base stations 105-*b*, 105-*c* may schedule, and the UEs 115-*b*, 115-*c* may perform non-codebook duplex communications that take into account BWPs and resource bandwidths for the BWPs as described herein.

Figure 3B:
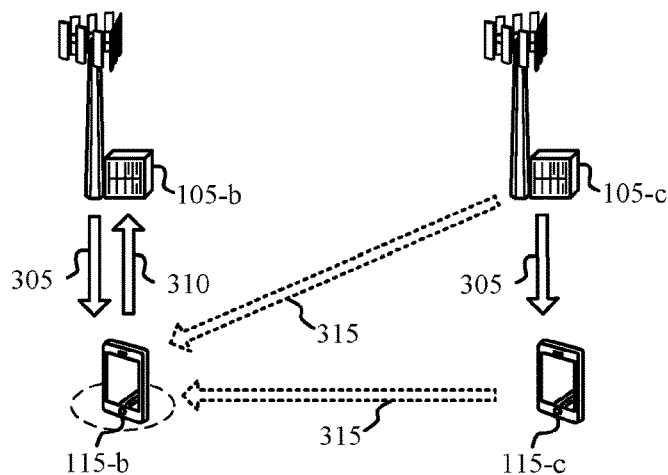

FIG. 3B illustrates an example of a wireless communications system 300-*b* in accordance with aspects of the present disclosure. The wireless communications system 300-*b* may, in some examples, implement aspects of the wireless communications systems 100 or 200. For example, the wireless communications system 300-*b* may support half-duplex communications or full-duplex communications. In the example of FIG. 3B, base stations 105-*b*, 105-*c* may be configured to support full-duplex communications in the wireless communications system 300-*b*. For example, the base stations 105-*b*, 105-*c* may support full-duplex communications with UEs 115-*b*, 115-*c*. The base stations 105-*b*, 105-*c* and the UEs 115-*b*, 115-*c* may be examples of base stations 105 and UEs 115 described herein.

In the example of FIG. 3B, the UEs 115-*b*, 115-*c* may be configured to operate in a full-duplex mode. In the full-duplex mode, the UEs 115-*b*, 115-*c* may be configured to concurrently receive downlink communications and transmit uplink communications from and to the base stations 105-*b*, 105-*c*. Likewise, the base stations 105-*b*, 105-*c* may also operate in a full-duplex mode. The base station 105-*b*, 105-*c* may provide downlink communications using one or multiple directional beams. Similarly, the UEs 115-*b*, 115-*c* may provide uplink communications using one or multiple directional beams. In some cases, one or more of the base stations 105-*b*, 105-*c* and the UEs 115-*b*, 115-*c* may experience self-interference or other interference in the wireless communications system 300-*b*. For example, the UE 115-*b* may experience self-interference from downlink communications to uplink communications.

By way of example, the base station 105-*b* may transmit downlink communications 305 to the UE 115-*b*, which the UE 115-*b* may receive via at least one antenna panel of the UE 115-*b*. The UE 115-*b* may also transmit uplink communications 310 to the base station 105-*b* via another antenna panel of the UE 115-*b*. This may cause self-interference at the UE 115-*b* due to, for example, simultaneous reception of the downlink communications 305 using the at least one antenna panel of the UE 115-*b* and transmission of the uplink communications 310 using the other antenna panel of the UE 115-*b*. Likewise, the base station 105-*c* may transmit downlink communications 305 to the UE 115-*c*, and the UE 115-*c* may transmit uplink communications (not shown) to the base station 105-*c*. This may cause self-interference at the UE 115-*c*. The base station 105-*b* or the UE 115-*b*, or both, may also experience some interference communications 315 from the base station 105-*c* or the UE 115-*c*, or both. The interference communications 315 may be associated with the downlink communications 305 from the base station 105-*c* to the UE 115-*c*, or the uplink communications (not shown) from the UE 115-*c* to the base station 105-*c*, or both. To reduce or eliminate the self-interference at the UEs 115-*b*, 115-*c* (or any other UE 115) may communicate using one or more resource bandwidths for a BWP allocated for uplink communications or downlink communications, or both.

Further, to help reduce or eliminate interference, in some cases the UEs 115-*b*, 115-*c* may be configured to receive a BWP configuration defining a set of resource bandwidths for one or multiple BWPs. The UEs 115-*b*, 115-*c* may identify at least one downlink reference signal (e.g., CSI-RS) resource that is associated with one or more sets of uplink reference signal (e.g., SRS) resource sets, one or more uplink data channel (e.g., PUSCH) resources, or combinations thereof. The UEs 115-*b*, 115-*c* may transmit non-codebook based uplink communications by calculating precoding parameters based on reference signal measurements in the downlink reference signal resources, and using the precoding parameters for uplink communications. The base stations 105-*b*, 105-*c* may schedule, and the UEs 115-*b*, 115-*c* may perform non-codebook duplex communications that take into account BWPs and resource bandwidths for the BWPs as described herein.

Figure 3C:
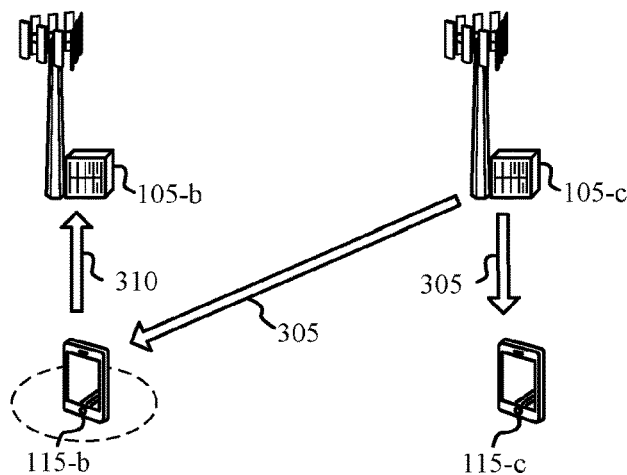

FIG. 3C illustrates an example of a wireless communications system 300-*c* in accordance with aspects of the present disclosure. The wireless communications system 300-*c* may, in some examples, implement aspects of the wireless communications systems 100 or 200. For example, the wireless communications system 300-*c* may support half-duplex communications or full-duplex communications. In the example of FIG. 3C, base stations 105-*b*, 105-*c* may be configured to support full-duplex communications in the wireless communications system 300-*b*. For example, the base stations 105-*b*, 105-*c* may support full-duplex communications with UEs 115-*b*, 115-*c*. The base stations 105-*b*, 105-*c* and the UEs 115-*b*, 115-*c* may be examples of base stations 105 and UEs 115 described herein.

In the example of FIG. 3C, the UEs 115-*b*, 115-*c* may be configured to operate in a full-duplex mode with multiple-transmission and reception points (multi-TRPs). In the full-duplex mode, the UEs 115-*b*, 115-*c* may be configured to concurrently receive downlink communications and transmit uplink communications from and to the base stations 105-*b*, 105-*c*. Likewise, the base stations 105-*b*, 105-*c* may also operate in a full-duplex mode. The base station 105-*b*, 105-*c* may provide downlink communications using one or multiple directional beams. Similarly, the UEs 115-*b*, 115-*c* may provide uplink communications using one or multiple directional beams. In some cases, one or more of the base stations 105-*b*, 105-*c* and the UEs 115-*b*, 115-*c* may experience self-interference or other interference in the wireless communications system 300-*b*. For example, the UE 115-*b* may experience self-interference from downlink communications to uplink communications.

By way of example, the UE 115-*b* may receive downlink communications 305 from the base station 105-*c* using one TRP of the UE 115-*b*, and transmit uplink communications 310 to the base station 105-*b* using another TRP of the UE 115. The reception of the downlink communications 305 and the transmission of the uplink communications 310 may occur simultaneously. This may cause self-interference at the UE 115-*b*. Similarly, the base station 105-*c* may transmit downlink communications 305 to the UE 115-*b* using one TRP of the base station 105-*c* and transmit downlink communications 305 to the UE 115-*c* using another TRP of the base station 105-*c*. To reduce or eliminate the self-interference at the UEs 115-*b*, 115-*c* (or any other UE 115) one or more resource bandwidths for one or more BWPs may be allocated for uplink communications or downlink communications, or both.

Further, to help reduce or eliminate interference, in some cases the UEs 115-*b*, 115-*c* may be configured to receive a BWP configuration defining a set of resource bandwidths for one or multiple BWPs. The UEs 115-*b*, 115-*c* may identify at least one downlink reference signal (e.g., CSI-RS) resource that is associated with one or more sets of uplink reference signal (e.g., SRS) resource sets, one or more uplink data channel (e.g., PUSCH) resources, or combinations thereof. The UEs 115-*b*, 115-*c* may transmit non-codebook based uplink communications by calculating precoding parameters based on reference signal measurements in the downlink reference signal resources, and using the precoding parameters for uplink communications. The base stations 105-*b*, 105-*c* may schedule, and the UEs 115-*b*, 115-*c* may perform non-codebook duplex communications that take into account BWPs and resource bandwidths for the BWPs as described herein.

Figure 4A:
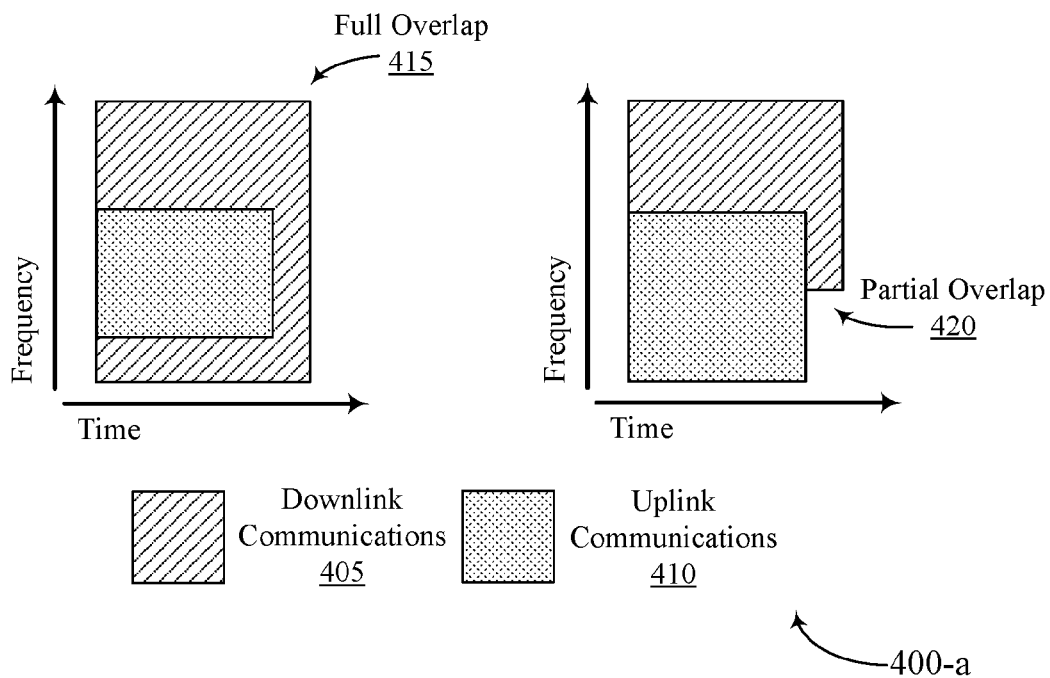
FIGS. 4A and 4B illustrate examples of full duplex configurations that support bandwidth part and resource bandwidth switching in wireless communications in accordance with aspects of the present disclosure.

FIG. 4A illustrates an example of a full duplex communications configuration 400-*a* that supports uplink reference signal techniques for non-codebook-based wireless communications in accordance with aspects of the present disclosure. In some examples, full duplex communications configuration 400-*a* may implement aspects of wireless communications system 100, 200, or 300. For example, the configuration 400-*a* may be based on a full-duplex configuration provided by a base station 105 and implemented by the base station 105 or a UE 115, or both. In some examples, the base station 105 or the UE 115, or both, may support in-band full-duplex (IBFD) operations. According to IBFD operations, the base station 105 and the UE 115 may transmit and receive communications simultaneously in a same frequency band, and thereby increase throughput of a wireless communications systems, for example the wireless communications systems 100, 200, or 300.

The base station 105 and the UE 115 may, for example, transmit and receive communications (e.g., downlink communications 405, uplink communications 410) on same time and frequency resources, such as symbol, a minislot, a subframe, frames, subcarriers, carriers, etc. The downlink communications 405 and the uplink communications 410 may thereby share same IBFD time and frequency resources. The base station 105 may provide downlink communications 405 using one or multiple directional beams via one or more antenna panels. Similarly, the UE 115 may provide uplink communications 410 using one or multiple directional beams via one or more antenna panels. In some examples, there may be a full overlap 415 between IBFD time and frequency resources associated with the downlink communications 405 and the uplink communications 410. In some other examples, there may be a partial overlap 420 between IBFD time and frequency resources associated with the downlink communications 405 and the uplink communications 410.

In accordance with aspects of the present disclosure, a UE 115 operating in a full-duplex mode, such as configurations illustrated by the configuration 400-*a*, may determine one or more resource bandwidths for one or more BWPs allocated for uplink communications or downlink communications, or both. One or more downlink reference signal resources may be associated with one or more uplink reference signal resources sets and/or one or more PUSCH resources, where precoding parameters for uplink communications using the associated uplink resources are determined based on measurements of the downlink reference signal resources.

Figure 4B:
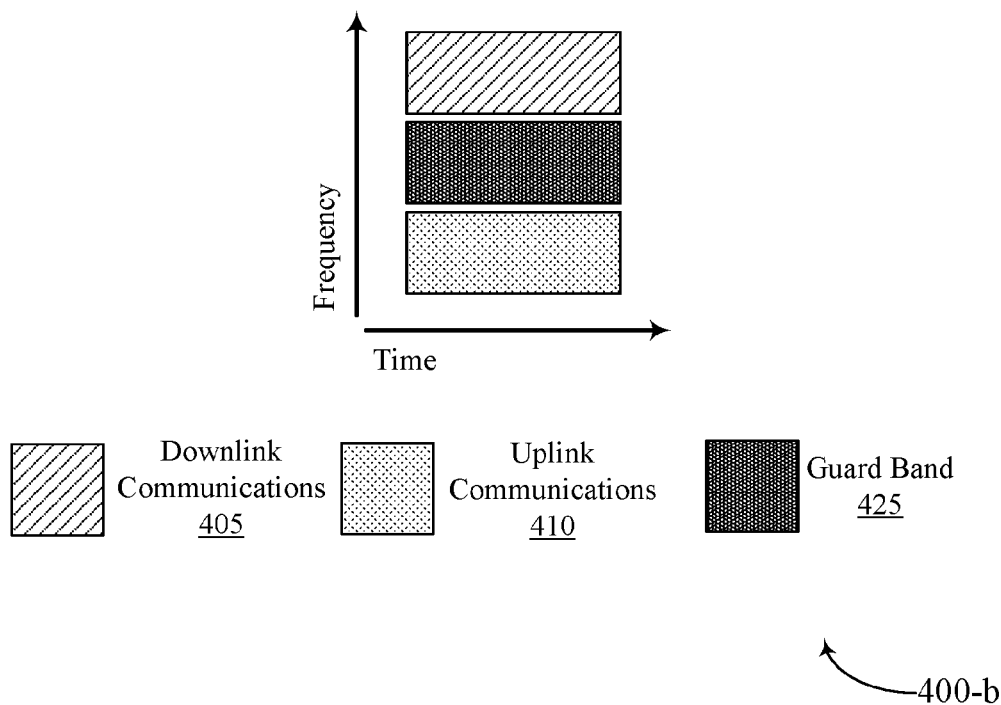

FIG. 4B illustrates an example of a configuration 400-*b* that supports bandwidth part and resource bandwidth switching in accordance with aspects of the present disclosure. The configuration 400-*b* may implement aspects of the wireless communications systems 100, 200, or 300. For example, the configuration 400-*b* may be based on a full-duplex configuration provided by a base station 105, and implemented by the base station 105 or a UE 115, or both. The base station 105 may support full-duplex communications including transmitting downlink communications 405, and receiving uplink communications 410, using one or multiple directional beams. Similarly, the UE 115 may support full-duplex communications including transmitting uplink communications 410 in an uplink band, and receiving the downlink communications 405 in a downlink band, using one or multiple directional beams via one or more antenna panels. In some examples, the base station 105 or the UE 115, or both, may support FDD operations resources associated with full-duplex communications.

The base station 105 and the UE 115 may, for example, transmit and receive communications (e.g., the downlink communications 405, the uplink communications 410) on same time resources (e.g., symbol, a minislot, a subframe, frames) but different frequency resources (e.g., subcarriers, carriers). As such, the downlink communications 405 and the uplink communications 410 may be separated in a frequency domain. Additionally, in some examples, there may be a guard band 425 in a frequency domain between the downlink communications 405 in a downlink band and the uplink communications 410 in an uplink band. The guard band 425 may be an unused part of a radio frequency spectrum between at least two radio frequency spectrum subbands or bands, for reducing interference, for example, between the downlink communications 405 in the downlink band and the uplink communications 410 in the uplink band.

In accordance with aspects of the present disclosure, a UE 115 operating in a full-duplex mode, such as in configurations illustrated by the configuration 400-*b*, may determine one or more resource bandwidths for one or more BWPs allocated for uplink communications or downlink communications, or both. One or more downlink reference signal resources may be associated with one or more uplink reference signal resources sets and/or one or more PUSCH resources, where precoding parameters for uplink communications using the associated uplink resources are determined based on measurements of the downlink reference signal resources.

Figure 5:
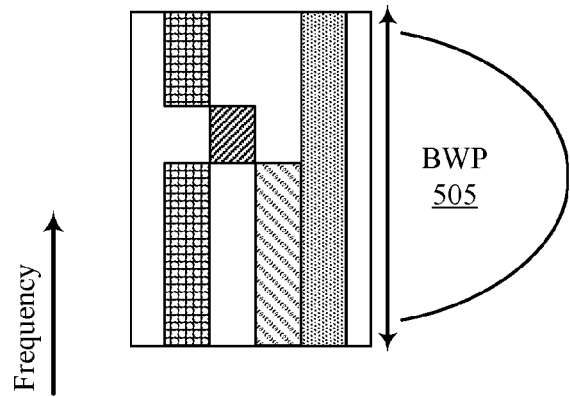
FIG. 5 illustrates an example of a radio frequency sub-band configuration that supports uplink reference signal techniques for non-codebook-based wireless communications in accordance with aspects of the present disclosure.

FIG. 5 illustrates an example of a radio frequency subband configuration 500 that supports uplink reference signal techniques for non-codebook-based wireless communications in accordance with aspects of the present disclosure. In some examples, radio frequency subband configuration 500 may implement aspects of wireless communications system 100, 200, or 300. For example, the radio frequency subband configuration 500 may support half-duplex communications or full-duplex communications. The configuration 500 may be based on a configuration by a base station (e.g., a base station 105 as discussed herein) or a UE (e.g., a UE 115 as discussed herein), and implemented by the UE, and may promote fast switching in duplex communications by supporting resource bandwidth and BWP operations. The configuration 500 may also be based on a configuration by the base station or the UE, and implemented by the UE to promote high reliability and low latency wireless communications by providing an indication identifying one or more BWPs and one or more resource bandwidths, among other benefits.

A UE may communicate (e.g., receive downlink communications or transmit uplink communications or both) with a base station, or another UE, or both, over one or more BWPs. For example, a BWP 505 may be configured for uplink communications of the UE and the base station, or may be configured for downlink communications of the UE and base station. The UE may identify a set of resource bandwidths (e.g., time and frequency resources) of the BWP, based on a BWP configuration received from the base station (e.g., via RRC signaling). For example, for the BWP, the UE may identify a resource bandwidth 510, identify a resource bandwidth 515, identify a resource bandwidth 520, and/or identify a resource bandwidth 525 associated with the BWP 505 based on the BWP configuration. In some examples, the UE may receive separate BWP configurations for uplink and downlink BWPs 505.

The UE may determine that at least one resource bandwidth of the set of resource bandwidths includes downlink reference signal resources (e.g., CSI-RS resources), and that at least one resource bandwidth includes one or more uplink reference signal (e.g., SRS) resource sets, one or more uplink data transmission (e.g., PUSCH) resources, or combinations thereof. In some examples, the UE may receive an indication of the BWP 505 configuration from the base station (e.g., via one or more information elements provided in RRC signaling). In some other examples, the UE may receive a DCI message or a MAC-CE including the indication of the BWP 505 configuration.

Each resource bandwidth may span the entire BWP 505 or a portion of BWP 505. Further, a resource bandwidth may be non-contiguous in the frequency domain within the configured BWP 505, such as illustrated for resource bandwidth 525. In some cases, the downlink reference signal resources within a first resource bandwidth may be used to measure a downlink reference signal (e.g., a CSI-RS). The measurements may be used to calculate precoding parameters for one or more associated uplink communications (e.g., PUSCH or SRS communications). In some cases, the uplink communications may span a same or a different set of frequency resources than the downlink reference signal frequency resources. In some cases, the different set of frequency resources may be at least partially overlapping the downlink reference signal frequency resources. Thus, the downlink reference signal may be measured at the UE for purposes of non-codebook communications.

Figure 6:
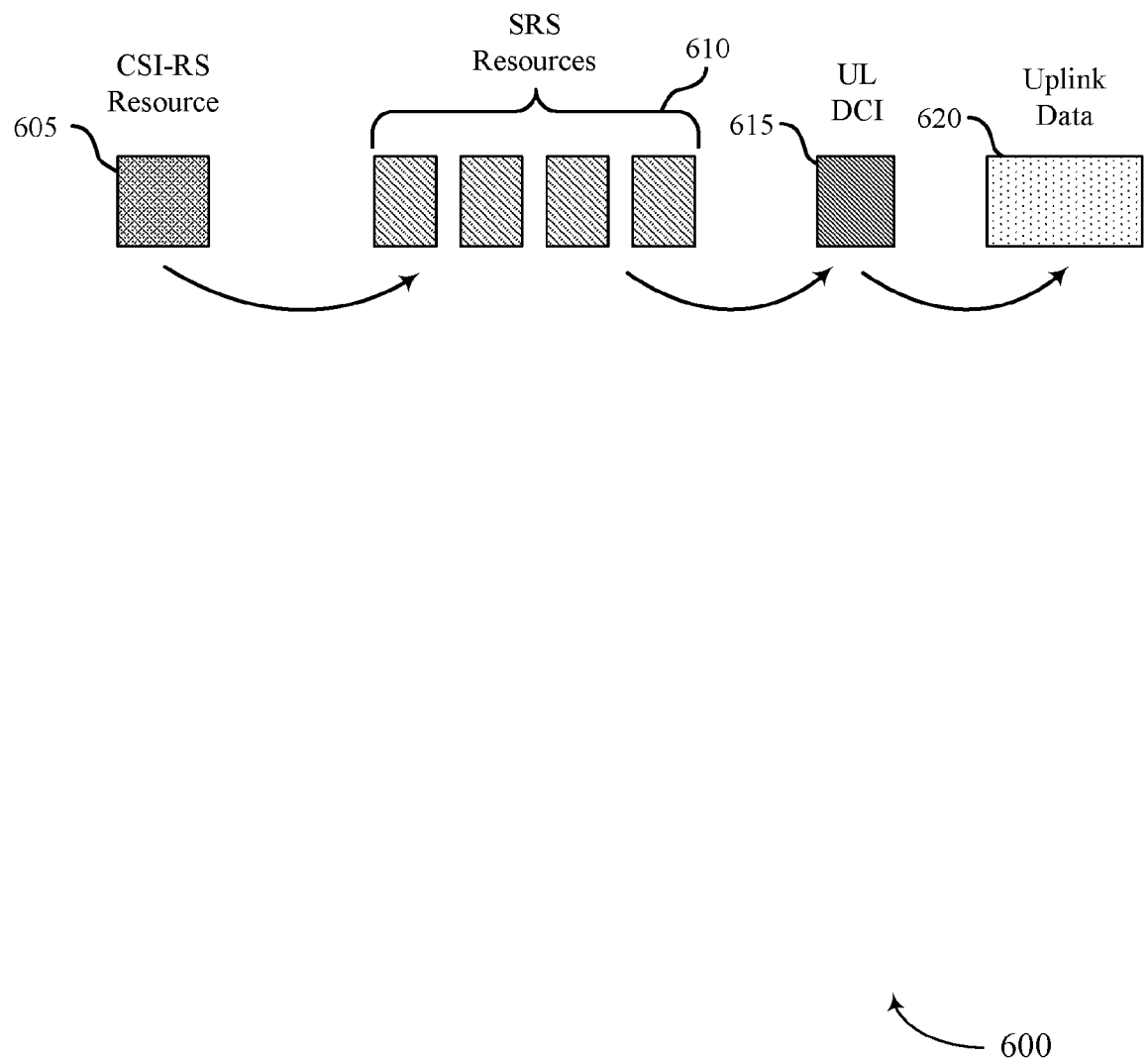
FIG. 6 illustrates an example of a non-codebook precoding determination that supports uplink reference signal techniques for non-codebook-based wireless communications in accordance with aspects of the present disclosure.

FIG. 6 illustrates an example of a non-codebook precoding determination 600 that supports uplink reference signal techniques for non-codebook-based wireless communications in accordance with aspects of the present disclosure. In some examples, non-codebook precoding determination 600 may implement aspects of wireless communications system 100, 200, or 300. In this example, CSI-RS resources 605 may be configured (e.g., in RRC signaling) within a resource bandwidth of a BWP. Further, the UE may be configured for non-codebook uplink communications.

In such examples, the UE may be configured with one SRS resource set 610 with "usage" set to "noncodebook." For example, the SRS resource set 610 may be configured with one associated non-zero power (NZP) CSI-RS resource (e.g., by RRC parameter 'associatedCSI-RS'), corresponding to CSI-RS resources 605. The UE may calculate the precoder used for the transmission on SRS resources within the SRS resource set 610 based on measurement of the associated NZP CSI-RS resource 605. In some cases, a maximum of four SRS resources within the set can be configured for the UE, and SRS may be transmitted using a precoder calculated for each SRS resource within the SRS resource set 610 based on measurements of the CSI-RS resource 605. The base station may receive the precoded SRSs and choose one or more SRS resources to indicate in downlink control information (DCI) 615 that provides information for an uplink grant to the UE (i.e., in UL DCI) for PUSCH scheduling. The UE may then transmit uplink data 620 in an uplink communication (e.g., in a PUSCH). In some cases, the uplink DCI 615 may include a SRS resource indicator (SRI) that indicates SRS resources, where the number of indicated SRS resources determined a rank of the uplink data 620 transmission (e.g., the SRI may indicate SRS resources 0 and 2, and thus the PUSCH has two layers and each layer is transmitted with the same precoding and beam as those used for transmission of SRS in corresponding SRS resources 610). The indicated SRI in a slot (e.g., in slot n) is associated with the most recent transmission of SRS resource(s) identified by the SRI, where the SRS transmission is prior to the PDCCH carrying the SRI. In accordance with aspects discussed herein, a CSI-RS resource in a first resource bandwidth may be associated with one or multiple SRS resource sets of a second resource bandwidth.

Figure 7:
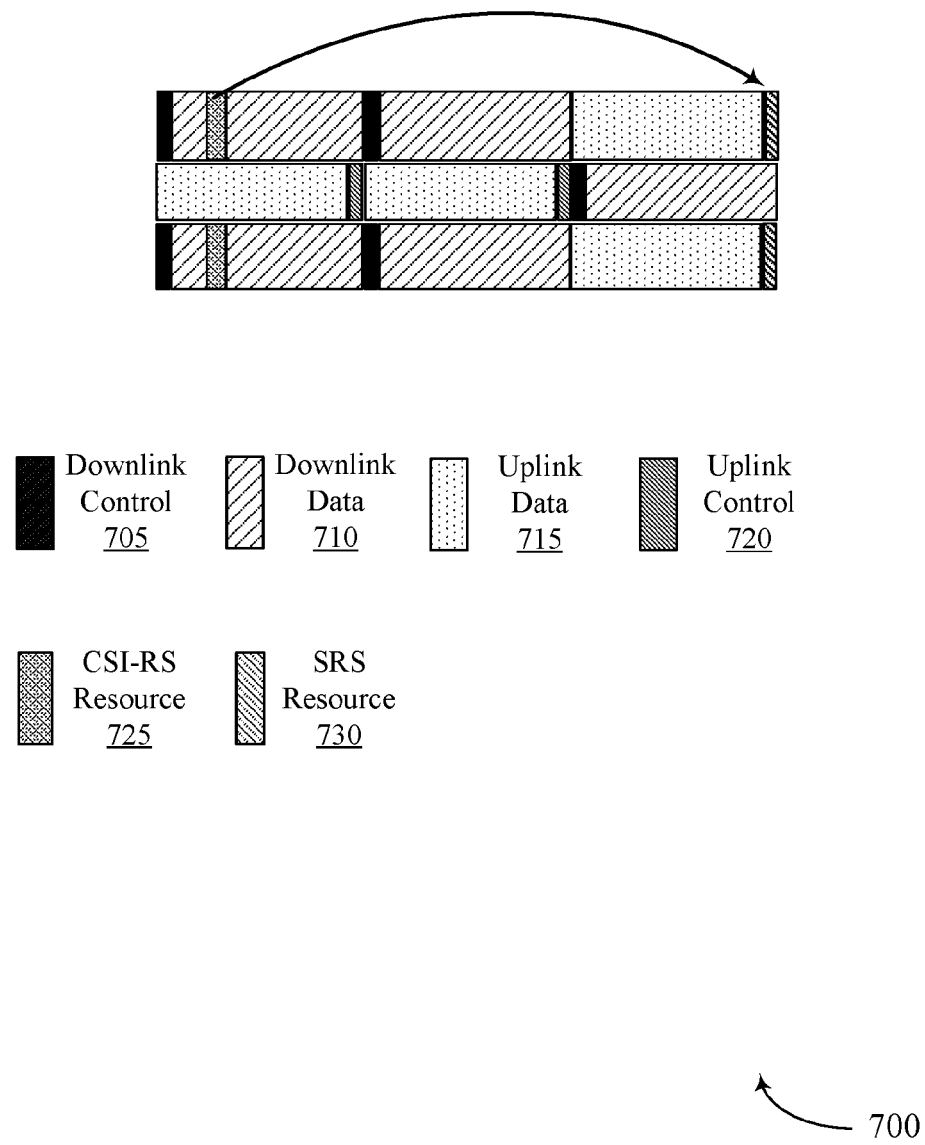
FIG. 7 illustrates an example of a BWP and resource bandwidth configuration that supports uplink reference signal techniques for non-codebook-based wireless communications in accordance with aspects of the present disclosure.

FIG. 7 illustrates an example of a BWP and resource bandwidth configuration 700 that supports uplink reference signal techniques for non-codebook-based wireless communications in accordance with aspects of the present disclosure. In some examples, BWP and resource bandwidth configuration 700 may implement aspects of wireless communications system 100, 200, or 300. For example, a base station or a UE, or both, as described herein may support various types of frequency ranges, such as Sub 6 GHz range (also referred to as FR1) and millimeter wave (mmW) range (also referred to as FR2 or FR4). In some examples, the base station or the UE, or both, may support a multiplexing operation on time and frequency resources when operating in one or multiple radio frequency spectrum subbands. The multiplexing operation may be an FDD operation and a TDD operation. The resource bandwidth configuration 700 may reduce or mitigate self-interference by isolating antenna panels of the base station or the UE, or both. This isolation may provide an improvement to reduction of noise experienced at antenna panels (e.g., signal-to-noise ratio (SNR) >50 db or SNR>40 dB for sub-band full duplex).

In the example of FIG. 7, the base station or the UE, or both, may support an FDD operation and a TDD operation on time and frequency resources for downlink communications (e.g., downlink control 705, downlink data 710) and uplink communications (e.g., uplink control 715, uplink data 720) in an unpaired spectrum. One or more downlink bands and one or more uplink bands may be in different portions of a radio frequency spectrum. In some examples, there may be a guard band between a downlink band and an uplink band. The base station may provide downlink communications (e.g., downlink control 705, downlink data 710) using one or multiple directional beams via one or multiple antenna panels according to the resource bandwidth configuration 700 (e.g., TDD and FDD). The UE may also provide uplink communications (e.g., uplink control 715, uplink data 720) using one or multiple directional beams via one or multiple antenna panels according to the resource bandwidth configuration 700 (e.g., TDD and FDD). The base station or the UE, or both, may thus support FDD and TDD operations in an unpaired spectrum for duplexed communications between the base station and the UE.

The resource bandwidth configuration 700 may mitigate self-interference at a base station or a UE, or both. For example, the base station or the UE, or both, may be configured with at least two separate antenna panels for simultaneous transmission and reception operations. For example, the base station may be configured with at least two separate antenna panels for simultaneous transmission and reception operations. Likewise, the UE may be configured with at least two separate antenna panels for simultaneous transmission and reception operations. With reference to FIG. 7, in some examples, one antenna panel of the two may be configured for downlink transmission at both edges of the resource bandwidth configuration 700, while the other antenna panel of the two may be configured for uplink reception in the middle of the resource bandwidth configuration 700.

The base station or the UE, or both, may support a time domain windowed overlap-and-add (WOLA) to reduce an adjacent-channel-leakage-ratio (ACLR) for a downlink signal or an uplink signal. The base station or the UE, or both, may use an analog low-pass filter to improve an analog-to-digital converter (ADC) dynamic range. The base station or the UE, or both, may improve automatic gain control (AGC) states to improve a noise figure (NF). In some examples, a digital integrated circuit (IC) of the ACLR leakage may be above 20 dB (i.e., ACLR leakage >20 db). The base station or the UE, or both, may use a non-linear model per each transmitter-receiver pair.

In accordance with aspects of the present disclosure, a UE operating in a full-duplex mode, such as configurations illustrated by the resource bandwidth configuration 700, may determine CRS-RS resources 725 within a first resource bandwidth, that may be associated with one or multiple sets of SRS resources 730 in a second resource bandwidth that is different than the first resource bandwidth. As such, a base station may schedule, and the UE may perform, duplex communications that take into account BWPs and resource bandwidths for the BWPs using non-codebook uplink communications as described herein.

Returning to FIG. 2, the UE 115-*a* may switch a BWP when communicating with the base station 105-*a*. For example, the UE 115-*a* may switch from a BWP 220 to a BWP 225 for communicating with the base station 105-*a*. In some examples, the UE 115-*a* may switch a BWP based on receiving a message from the base station 105-*a*. In some examples, the message may be a DCI message that may include a DCI command for the UE 115-*a* to switch a BWP and include a BWP identifier that may indicate for the UE 115-*a* the BWP to switch to. The message may identify a specific BWP that can be activated by a BWP identifier (e.g., which may also referred to as a BWP indicator). In some other examples, the message may be an RRC message or a MAC-CE, among others.

A bandwidth within a BWP 215 (e.g., the BWP 220 and/or the BWP 225) may, in some cases, be impacted because of a downlink band, a guard band, or an uplink band, or any combination thereof. The base station 105-*a* may thus configure the UE 115-*a* with one or more resource bandwidths that correspond to time and frequency resources associated with the BWP 215 (e.g., the BWP 220 and/or the BWP 225) allocated for downlink communications or uplink communications. The resource bandwidths may thus accommodate disjoint bandwidth allocation for duplex communications, such as full-duplex communications supporting both downlink communications and uplink communications. In some cases, the base station 105-*a* and the UE 115-*a* may support joint indication to switch BWP and resource bandwidths.

The UE 115-*a* may be configured to receive, from the base station 105-*a*, a BWP configuration defining a set of resource bandwidths for one or multiple BWPs 215. Each resource bandwidth may define time and frequency resources for one or multiple BWPs 215 allocated for downlink communications or uplink communications. The BWP configuration may also provide CSI-RS resources and SRS resource sets for use in non-codebook communications as discussed herein.

Figure 8:
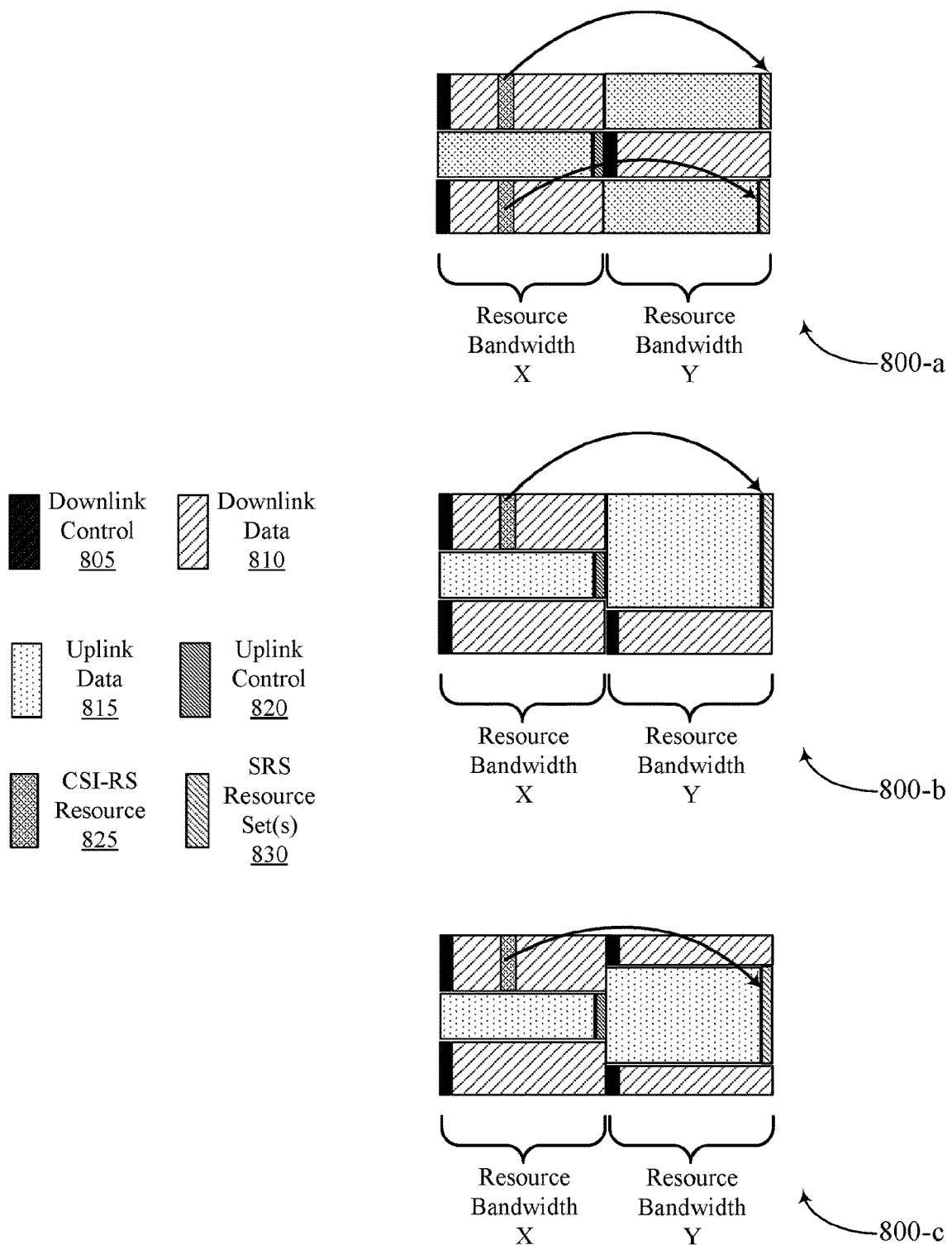
FIG. 8 illustrates further examples of BWP and resource bandwidth configurations that support uplink reference signal techniques for non-codebook-based wireless communications in accordance with aspects of the present disclosure.

FIG. 8 illustrates examples of BWP and resource bandwidth configurations 800 that support uplink reference signal techniques for non-codebook-based wireless communications in accordance with aspects of the present disclosure. In some examples, BWP and resource bandwidth configurations 800 may implement aspects of wireless communications system 100, 200, or 300. In each of the example BWP and resource bandwidth configurations 800, the base station may provide downlink communications (e.g., downlink control 805, downlink data 810) using one or multiple directional beams via one or multiple antenna panels and the UE may also provide uplink communications (e.g., uplink control 815, uplink data 820) using one or multiple directional beams via one or multiple antenna panels. The base station or the UE, or both, may thus support FDD and TDD operations in an unpaired spectrum for duplexed communications between the base station and the UE.

The downlink resources of one or more resource bandwidths may include CSI-RS resources 825. In some cases, a single CSI-RS resource 825 at a first resource bandwidth (e.g., resource bandwidth X in the examples of FIG. 8) may be associated with one or more SRS resources sets with 'non-codebook' usage at a second resource bandwidth (e.g., resource bandwidth Y in the examples of FIG. 8). The CSI-RS resource 825 may have an allocation of either contiguous or noncontiguous frequency domain resource blocks (RBs). For instance, in a first example 800-*a* the CSI-RS resource 825 allocation spans noncontiguous RBs within resource bandwidth X, while in a second example 800-*b* and a third example 800-*c* the CSI-RS resource 825 allocation spans contiguous RBs within resource bandwidth X. The CSI-RS resource 825 and the SRS resource set(s) 830 can be partially or fully overlapped in the frequency domain, such as illustrated in the first example 800-*a* as fully overlapping, and in the second example 800-*b* and third example 800-*c* as partially overlapping. The associations of the SRS resource set(s) 830 and CSI-RS resource 825 may be applicable for periodic, semi-persistent, or aperiodic CSI-RS, and for periodic, semi-persistent, or aperiodic SRS.

As discussed with reference to FIG. 6, the base station may provide a SRI to the UE. In some cases, the PUSCH, the indicated SRS resource set(s) and/or SRS resource(s) may be in a same resource bandwidth. In such cases, the uplink grant DCI may include a SRI, resource bandwidth index, and PUSCH information, where the SRI may be used for the SRS resources defined within that resource bandwidth index. In cases where more than one SRS resource set 830 is defined within the resource bandwidth, a SRI bit field in the uplink grant DCI may indicate the same SRS resources for each SRS resource set 830. In other cases, the SRI bit field may have a number of bits that may be used to represent SRS resources independently for each SRS resource set 830.

In some cases, the PUSCH and indicated SRS resource set(s) and/or SRS resource(s) may be in different resource bandwidths. In such cases, the uplink grant DCI may contain one resource bandwidth index value for PUSCH and another one for the SRS resource set 830 in addition to the SRS and the PUSCH information. The SRI in such cases may be associated with the SRS resources defined within that resource bandwidth index. The PUSCH and SRS may have full or partial frequency domain overlapping, and the resource bandwidths of PUSCH and SRS may be within the same active BWP. In cases where more than one SRS resource set 830 is defined within the BPW, a SRI bit field in the uplink grant DCI may indicate the same SRS resources for each SRS resource set 830, or the SRI bit field may have a number of bits that may be used to represent SRS resources independently for each SRS resource set 830.

In some cases, if separate resource bandwidth indices for PUSCH and SRS are needed the uplink grant DCI may include explicit bits to provide such indications (e.g., 2 bits for PUSCH resource bandwidth and 2 bits for SRS resource bandwidth), or N bits (e.g., N>2) may be provided in the DCI representing a codepoint for an RRC configured table that indicates jointly the resource bandwidth for both SRS and PUSCH. In other cases, the DCI may include an SRI bit field that has bits to represent SRS resources independently for each SRS resource set. In such cases, N1+N2 bits may be provided in the DCI where N1 bits represent SRI for the first SRS resource set and N2 represents the SRI for the second SRS resource set. Alternatively, M bits may be provided in the DCI representing a codepoint of an RRC configured table that jointly indicates the SRI for each SRS resource set. Additional examples of CSI-RS resources and associated SRS resource sets are illustrated in FIG. 9.

Figure 9:
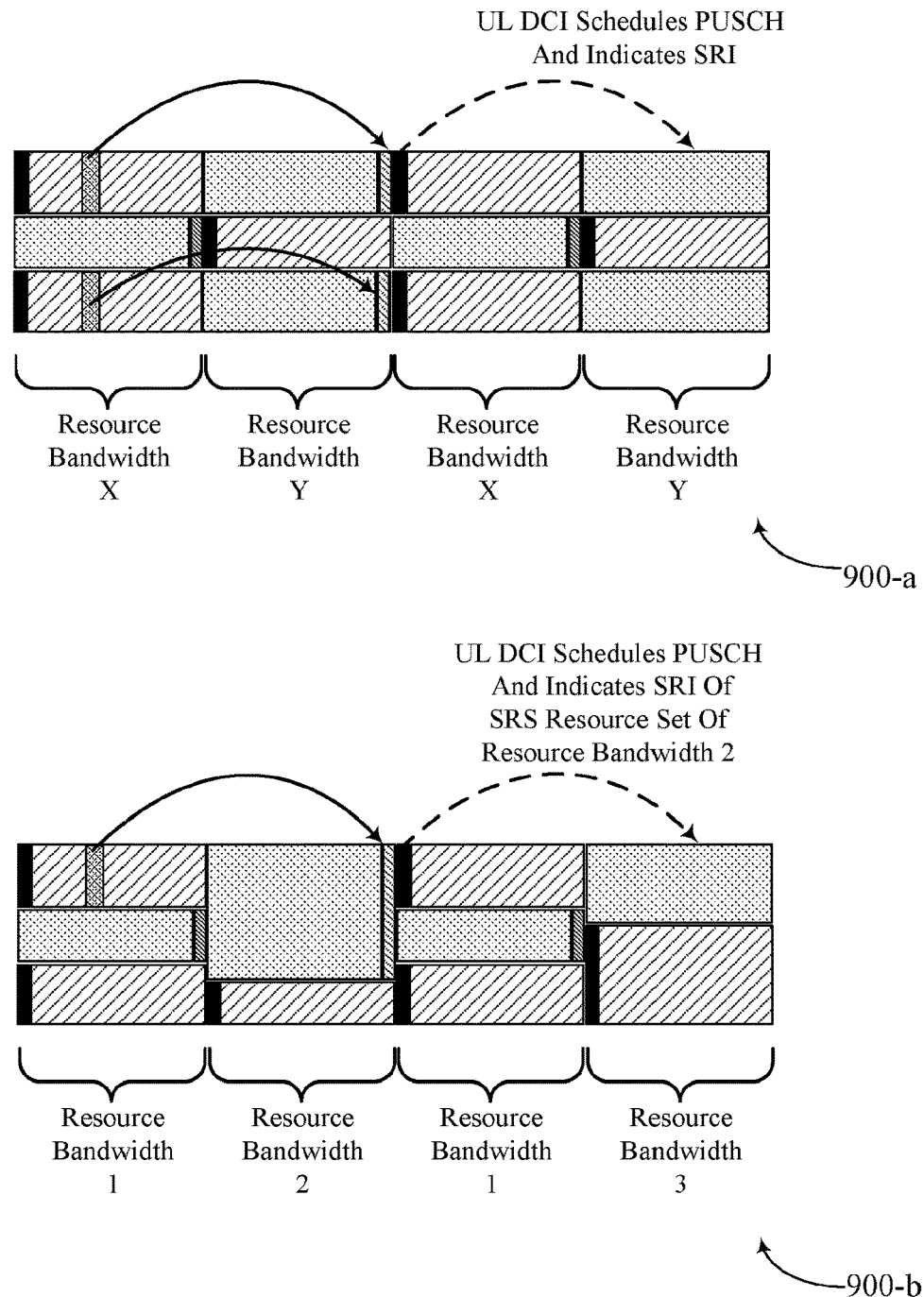
FIG. 9 illustrates additional examples of BWP and resource bandwidth configurations that support uplink reference signal techniques for non-codebook-based wireless communications in accordance with aspects of the present disclosure.

FIG. 9 illustrates examples of BWP and resource bandwidth configurations 900 that support uplink reference signal techniques for non-codebook-based wireless communications in accordance with aspects of the present disclosure. In some examples, BWP and resource bandwidth configurations 900 may implement aspects of wireless communications system 100, 200, or 300. In each of the example BWP and resource bandwidth configurations 900, the base station may provide downlink communications (e.g., downlink control 905, downlink data 910) using one or multiple directional beams via one or multiple antenna panels and the UE may also provide uplink communications (e.g., uplink control 915, uplink data 920) using one or multiple directional beams via one or multiple antenna panels. The base station or the UE, or both, may thus support FDD and TDD operations in an unpaired spectrum for duplexed communications between the base station and the UE.

In the examples of FIG. 9, the downlink resources of one or more resource bandwidths may include CSI-RS resources 925 and SRS resource set(s) 930, similarly as discussed with reference to FIG. 8. In a first example 900-*a*, CSI-RS resources 925 may occupy RBs that are fully overlapping with SRS resource sets 930. In this example, in a first slot the UE may measure CSI-RS resources 925 in resource bandwidth X, and determine precoding for SRS transmissions in SRS resource sets 930 in a second slot in resource bandwidth Y. In this example, resource bandwidth X may be used in a third slot which may include downlink control information 905 that schedules PUSCH using resource bandwidth Y and indicates SRI for the PUSCH. The SRI may be indicated in accordance with techniques as discussed with reference to FIG. 8, for example. In this example, as the same resource bandwidth is used for SRS and PUSCH, PUSCH in the upper and lower subband may follow the SRS resource set in the upper and lower subband, and SRI can either indicate same rank and SRS resources for each PUSCH or can be separate for each PUSCH.

In a second example 900-*b*, CSI-RS resources 925 may occupy RBs that are partially overlapping with SRS resource sets 930. Further, the PUSCH may occupy RBs that are partially overlapping with the SRS resource sets 930. In this example, in a first slot the UE may measure CSI-RS resources 925 in resource bandwidth 1, and determine precoding for SRS transmissions in SRS resource sets 930 in a second slot in resource bandwidth 1. In this example, resource bandwidth 1 may be used in a third slot which may include downlink control information 905 that schedules PUSCH using resource bandwidth 3 and indicates SRI for the PUSCH. The SRI may be indicated in accordance with techniques as discussed with reference to FIG. 8, for example. In this example, the different resource bandwidths for SRS and PUSCH partially overlap, and PUSCH may be transmitted over resource bandwidth 3 using the SRI of the SRS resource set of resource bandwidth 2. It is to be understood that the various examples provided in FIGS. 8 and 9 are provided for purposes of illustration and discussion, and that numerous other examples of different resource bandwidths in duplex communications may use the described techniques.

Figure 10:
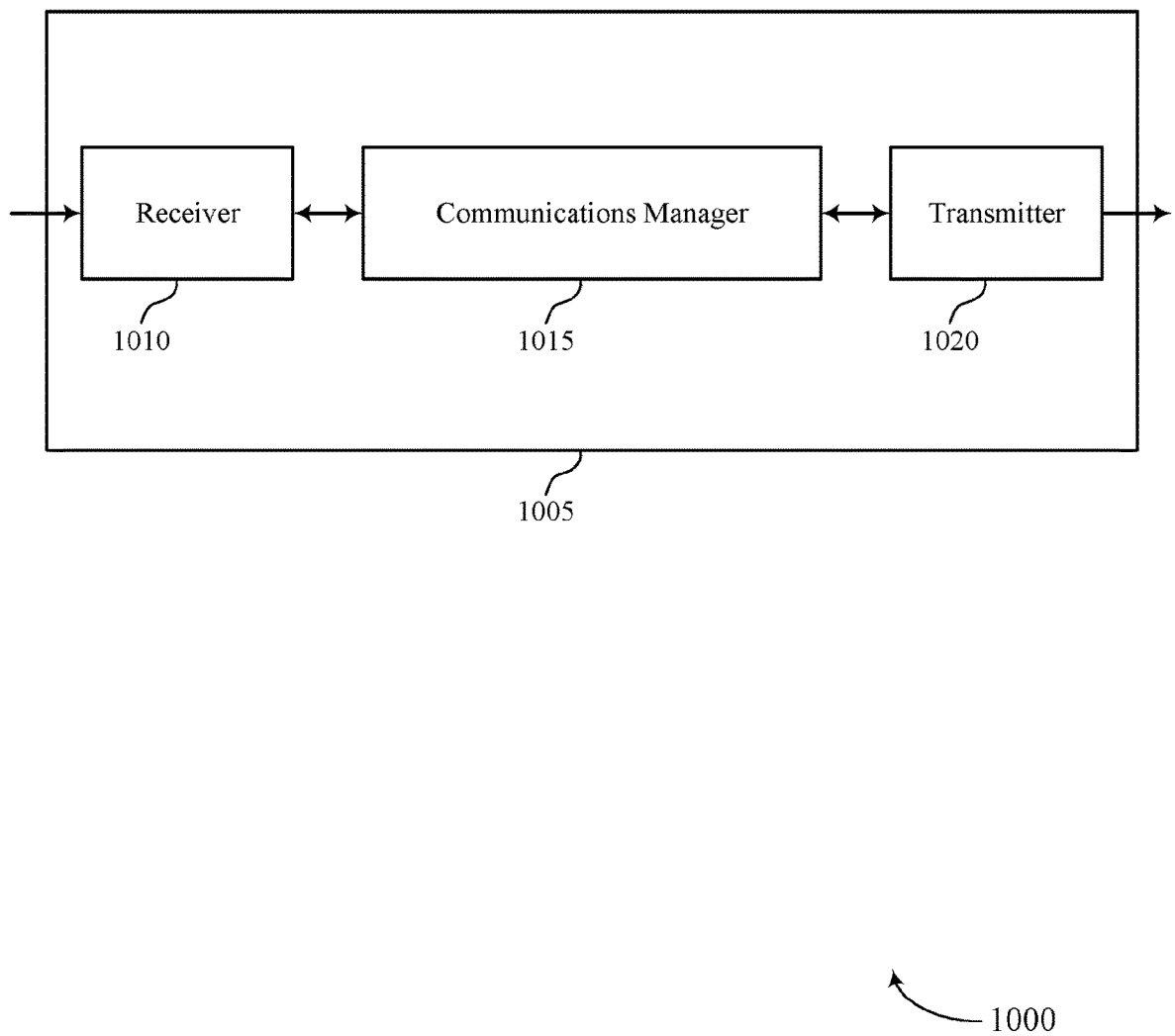
FIGS. 10 and 11 show block diagrams of devices that support uplink reference signal techniques for non-codebook-based wireless communications in accordance with aspects of the present disclosure.

FIG. 10 shows a block diagram 1000 of a device 1005 that supports uplink reference signal techniques for non-codebook-based wireless communications in accordance with aspects of the present disclosure. The device 1005 may be an example of aspects of a UE 115 as described herein. The device 1005 may include a receiver 1010, a communications manager 1015, and a transmitter 1020. The device 1005 may also include one or more processors, memory coupled with the one or more processors, and instructions stored in the memory that are executable by the one or more processors to enable the one or more processors to perform non-codebook-based wireless communications discussed herein. Each of these components may be in communication with each other (e.g., via one or more buses).

The receiver 1010 may receive information such as packets, user data, or control information associated with various information channels (e.g., control channels, data channels, and information related to uplink reference signal techniques for non-codebook-based wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may measure a downlink reference signal from a base station in a first resource bandwidth of a first bandwidth part of a channel bandwidth for communications between the UE and the base station, calculate, based on the measuring, precoding parameters for an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, and transmit the uplink reference signal using the calculated precoding parameters in each of the one or more reference signal resource sets in the second resource bandwidth of the first bandwidth part.

The communications manager 1015 may also receive, from a base station, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, calculate, based on a downlink reference signal received from the base station, precoding parameters for the first uplink reference signal and the first uplink shared channel communication, and transmit the first uplink reference signal and the first uplink shared channel communication using the calculated precoding parameters and the associated spatial domain parameters. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
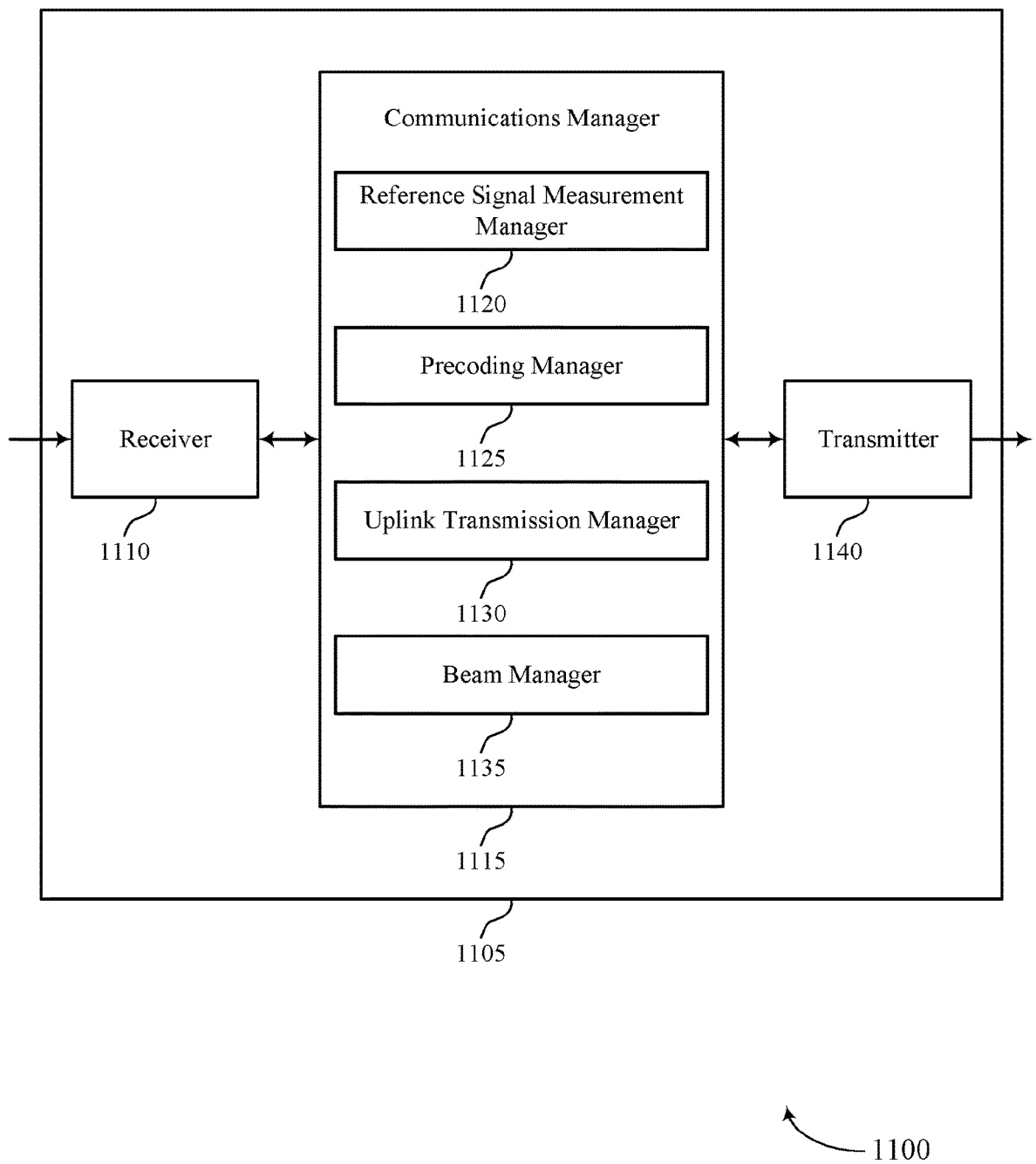

FIG. 11 shows a block diagram 1100 of a device 1105 that supports uplink reference signal techniques for non-codebook-based wireless communications in accordance with aspects of the present disclosure. The device 1105 may be an example of aspects of a device 1005, or a UE 115 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink reference signal techniques for non-codebook-based wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a reference signal measurement manager 1120, a precoding manager 1125, an uplink transmission manager 1130, and a beam manager 1135. The communications manager 1115 may be an example of aspects of the communications manager 1310 described herein.

In some cases, the reference signal measurement manager 1120 may measure a downlink reference signal from a base station in a first resource bandwidth of a first bandwidth part of a channel bandwidth for communications between the UE and the base station. The precoding manager 1125 may calculate, based on the measuring, precoding parameters for an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth. The uplink transmission manager 1130 may transmit the uplink reference signal using the calculated precoding parameters in each of the one or more reference signal resource sets in the second resource bandwidth of the first bandwidth part.

In some cases, the beam manager 1135 may receive, from a base station, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part. The precoding manager 1125 may calculate, based on a downlink reference signal received from the base station, precoding parameters for the first uplink reference signal and the first uplink shared channel communication. The uplink transmission manager 1130 may transmit the first uplink reference signal and the first uplink shared channel communication using the calculated precoding parameters and the associated spatial domain parameters.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

In some cases, the reference signal measurement manager 1120, precoding manager 1125, uplink transmission manager 1130, and beam manager 1135 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal measurement manager 1120, precoding manager 1125, uplink transmission manager 1130, and beam manager 1135 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 12:
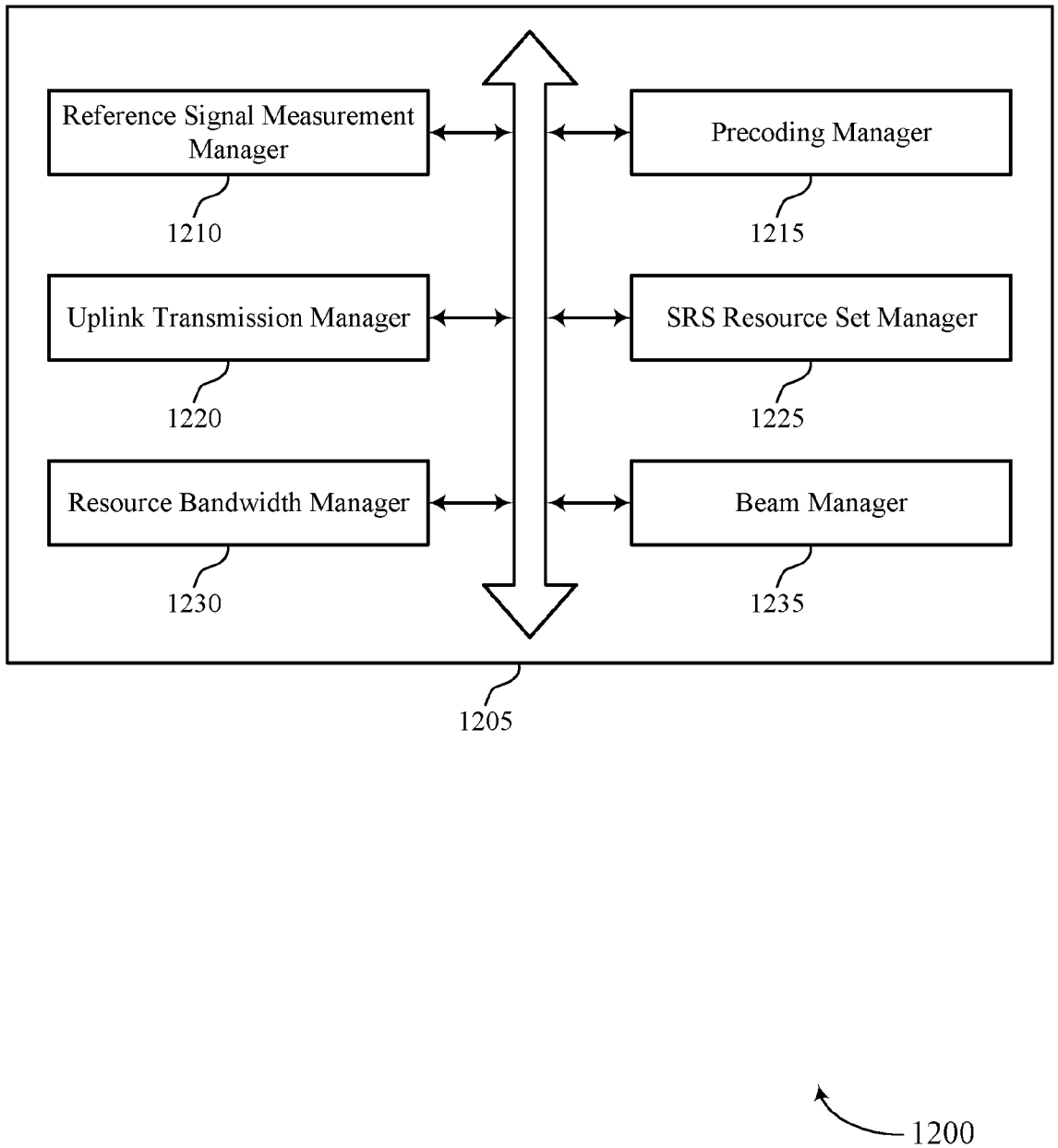
FIG. 12 shows a block diagram of a communications manager that supports uplink reference signal techniques for non-codebook-based wireless communications in accordance with aspects of the present disclosure.

FIG. 12 shows a block diagram 1200 of a communications manager 1205 that supports uplink reference signal techniques for non-codebook-based wireless communications in accordance with aspects of the present disclosure. The communications manager 1205 may be an example of aspects of a communications manager 1015, a communications manager 1115, or a communications manager 1310 described herein. The communications manager 1205 may include a reference signal measurement manager 1210, a precoding manager 1215, an uplink transmission manager 1220, a SRS resource set manager 1225, a resource bandwidth manager 1230, and a beam manager 1235. Each of these modules may communicate, directly or indirectly, with one another (e.g., via one or more buses).

The reference signal measurement manager 1210 may measure a downlink reference signal from a base station in a first resource bandwidth of a first bandwidth part of a channel bandwidth for communications between the UE and the base station. In some examples, the reference signal measurement manager 1210 may measure the downlink reference signal in contiguous or non-contiguous frequency domain resources within the first resource bandwidth.

The precoding manager 1215 may calculate, based on the measuring, precoding parameters for an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth. In some examples, the precoding manager 1215 may calculate, based on a downlink reference signal received from the base station, precoding parameters for the first uplink reference signal and the first uplink shared channel communication.

The uplink transmission manager 1220 may transmit the uplink reference signal using the calculated precoding parameters in each of the one or more reference signal resource sets in the second resource bandwidth of the first bandwidth part. In some examples, the uplink transmission manager 1220 may transmit the first uplink reference signal and the first uplink shared channel communication using the calculated precoding parameters and the associated spatial domain parameters. In some cases, an uplink grant provides separate resource bandwidth indices for the uplink shared channel communication and the uplink reference signal.

The beam manager 1235 may receive, from a base station, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part. In some cases, the uplink transmission control information indicates a first set of spatial domain parameters the first uplink reference signal and a second set of spatial domain parameters for the first uplink shared channel communication that are provided as separate indications for each set of spatial domain parameters, or are provided in an index value that is mapped to a configured table that indicates different sets of spatial domain parameters.

The SRS resource set manager 1225 may receive, from the base station, an uplink grant that includes an indication of the one or more reference signal resource sets in the second resource bandwidth, an indication of an index value associated with the second resource bandwidth, and uplink shared channel information for the second resource bandwidth. In some examples, the SRS resource set manager 1225 may receive, from the base station, an uplink grant that includes an indication of the one or more reference signal resource sets in the second resource bandwidth, an indication of a first index value associated with the second resource bandwidth, and uplink shared channel information for a third resource bandwidth that is different than the second resource bandwidth.

In some cases, the one or more reference signal resource sets fully or partially overlap frequency domain resources of the downlink reference signal. In some cases, the indication of the one or more reference signal resource sets indicates SRS resources that are defined within the second resource bandwidth. In some cases, a set of uplink reference signal resource sets within the second resource bandwidth are indicated by the uplink grant, and where the indication of the one or more reference signal resource sets is provided in a bit field that has separate bits to indicate each uplink reference signal resource set, or in a bit field that indicates each uplink reference signal resource set spans a same amount of resources.

In some cases, the uplink grant provides the first index value associated with the second resource bandwidth for the one or more reference signal resource sets and a second index value associated with the third resource bandwidth. In some cases, the first index value is mapped to the one or more reference signal resource sets of the second resource bandwidth. In some cases, an uplink grant provides separate reference signal resources for each of the one or more reference signal resource sets. In some cases, an uplink grant includes separate indications for each reference signal resource set, or an index value that is mapped to a configured table that provides different combinations of reference signal resources for each uplink reference signal resource set. In some cases, the first uplink reference signal fully or partially overlaps frequency domain resources of the downlink reference signal.

The resource bandwidth manager 1230 may transmit an uplink shared channel communication associated with the uplink reference signal in the second resource bandwidth. In some examples, resources for the first uplink shared channel communication occupy non-contiguous frequency resources within the first resource bandwidth or the second resource bandwidth, and separate spatial domain parameters are used for different portions of the non-contiguous frequency resources. In some cases, the uplink shared channel communication and the uplink reference signal have fully or partially overlapping frequency domain resources. In some cases, the second resource bandwidth and the third resource bandwidth are in a same bandwidth part of the channel bandwidth. In some cases, the uplink grant includes separate indications for each of the separate resource bandwidth indices, or an index value that is mapped to a configured table that provides the separate resource bandwidth indices for the uplink shared channel communication and the uplink reference signal. In some cases, the downlink reference signal occupies contiguous or non-contiguous frequency domain resources within the first resource bandwidth.

In some cases, the reference signal measurement manager 1210, precoding manager 1215, uplink transmission manager 1220, SRS resource set manager 1225, resource bandwidth manager 1230, and beam manager 1235 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal measurement manager 1210, precoding manager 1215, uplink transmission manager 1220, SRS resource set manager 1225, resource bandwidth manager 1230, and beam manager 1235 discussed herein.

Figure 13:
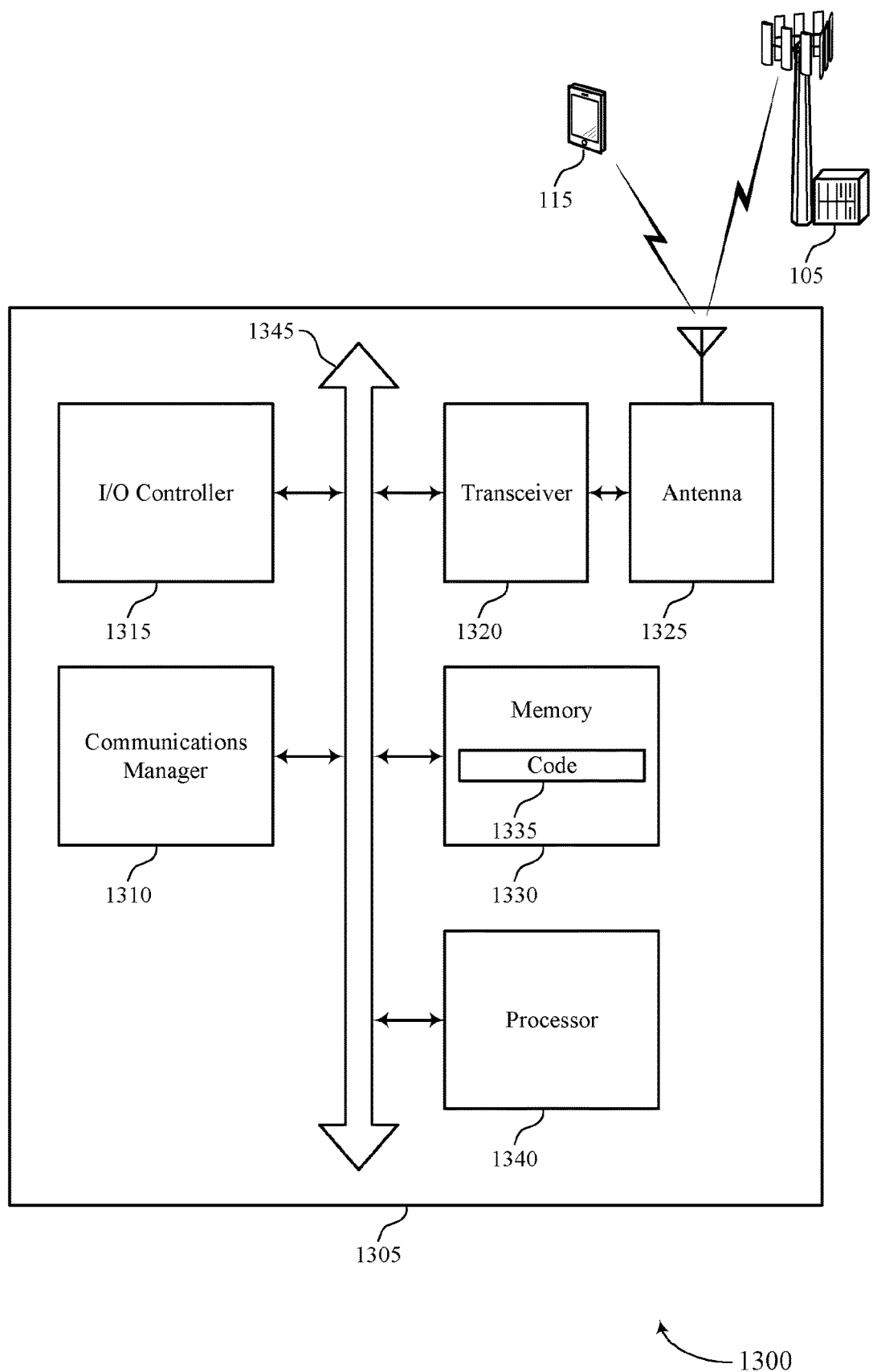
FIG. 13 shows a diagram of a system including a device that supports uplink reference signal techniques for non-codebook-based wireless communications in accordance with aspects of the present disclosure.

FIG. 13 shows a diagram of a system 1300 including a device 1305 that supports uplink reference signal techniques for non-codebook-based wireless communications in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may measure a downlink reference signal from a base station in a first resource bandwidth of a first bandwidth part of a channel bandwidth for communications between the UE and the base station, calculate, based on the measuring, precoding parameters for an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, and transmit the uplink reference signal using the calculated precoding parameters in each of the one or more reference signal resource sets in the second resource bandwidth of the first bandwidth part.

The communications manager 1310 may also receive, from a base station, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, calculate, based on a downlink reference signal received from the base station, precoding parameters for the first uplink reference signal and the first uplink shared channel communication, and transmit the first uplink reference signal and the first uplink shared channel communication using the calculated precoding parameters and the associated spatial domain parameters.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting uplink reference signal techniques for non-codebook-based wireless communications).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
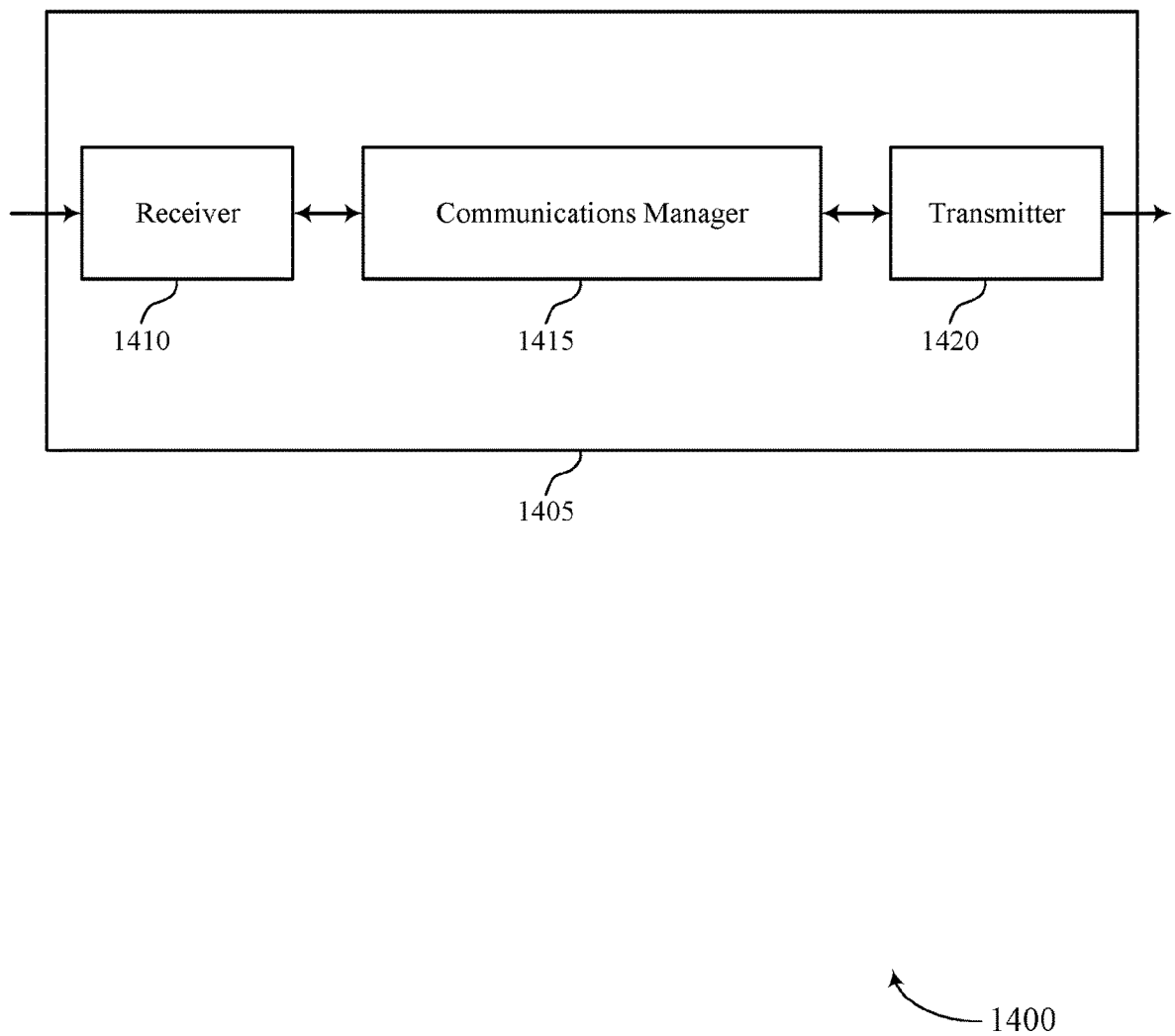
FIGS. 14 and 15 show block diagrams of devices that support uplink reference signal techniques for non-codebook-based wireless communications in accordance with aspects of the present disclosure.

FIG. 14 shows a block diagram 1400 of a device 1405 that supports uplink reference signal techniques for non-codebook-based wireless communications in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to uplink reference signal techniques for non-codebook-based wireless communications, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may configure a UE to transmit uplink communications based on calculated precoding parameters from measurements of a downlink reference signal in a first resource bandwidth of a first bandwidth part of a channel bandwidth, where the uplink communications include an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, transmit the downlink reference signal to the UE in the first resource bandwidth, and receive the uplink reference signal from the UE in each of the one or more reference signal resource sets in the second resource bandwidth of the first bandwidth part.

The communications manager 1415 may also transmit, to a UE, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, transmit a downlink reference signal to the UE for calculation of precoding parameters for the first uplink reference signal and the first uplink shared channel communication, and receive the first uplink reference signal and the first uplink shared channel communication using the associated spatial domain parameters. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
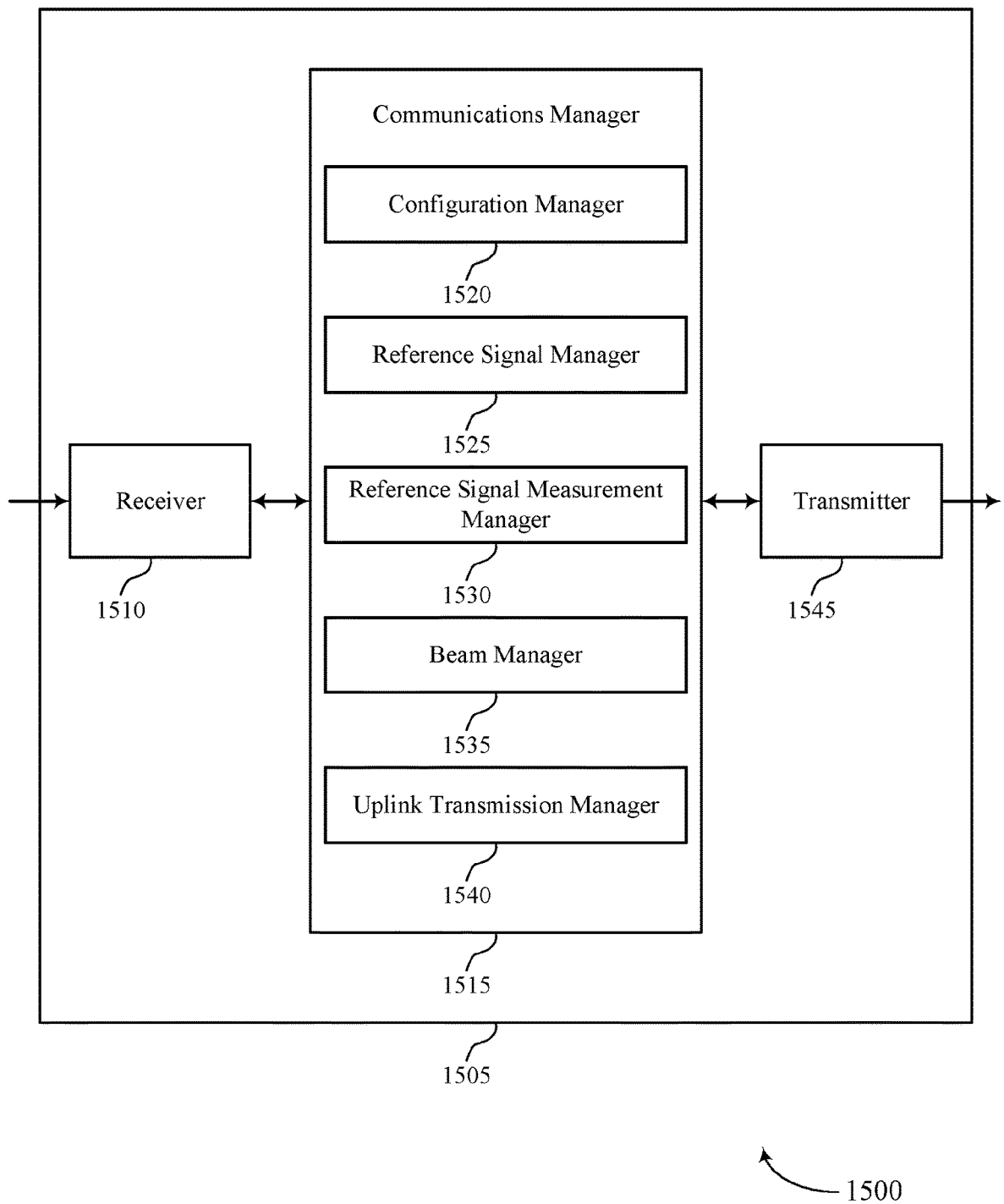

FIG. 15 shows a block diagram 1500 of a device 1505 that supports uplink reference signal techniques for non-codebook-based wireless communications in accordance with aspects of the present disclosure. The device 1505 may be an example of aspects of a device 1405, or a base station 105 as described herein. The device 1505 may include a receiver 1510, a communications manager 1515, and a transmitter 1545. The device 1505 may also include a processor. Each of these components may be in communication with one another (e.g., via one or more buses).

The receiver 1510 may receive information such as packets, user data, or control information associated with various information channels (e.g., control channels, data channels, and information related to uplink reference signal techniques for non-codebook-based wireless communications, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a configuration manager 1520, a reference signal manager 1525, a reference signal measurement manager 1530, a beam manager 1535, and an uplink transmission manager 1540. The communications manager 1515 may be an example of aspects of the communications manager 1710 described herein.

In some cases, the configuration manager 1520 may configure a UE to transmit uplink communications based on calculated precoding parameters from measurements of a downlink reference signal in a first resource bandwidth of a first bandwidth part of a channel bandwidth, where the uplink communications include an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth. The reference signal manager 1525 may transmit the downlink reference signal to the UE in the first resource bandwidth. The reference signal measurement manager 1530 may receive the uplink reference signal from the UE in each of the one or more reference signal resource sets in the second resource bandwidth of the first bandwidth part.

In some cases, the beam manager 1535 may transmit, to a UE, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part. The reference signal manager 1525 may transmit a downlink reference signal to the UE for calculation of precoding parameters for the first uplink reference signal and the first uplink shared channel communication. The uplink transmission manager 1540 may receive the first uplink reference signal and the first uplink shared channel communication using the associated spatial domain parameters.

The transmitter 1545 may transmit signals generated by other components of the device 1505. In some examples, the transmitter 1545 may be collocated with a receiver 1510 in a transceiver module. For example, the transmitter 1545 may be an example of aspects of the transceiver 1720 described with reference to FIG. 17. The transmitter 1545 may utilize a single antenna or a set of antennas.

Figure 16:
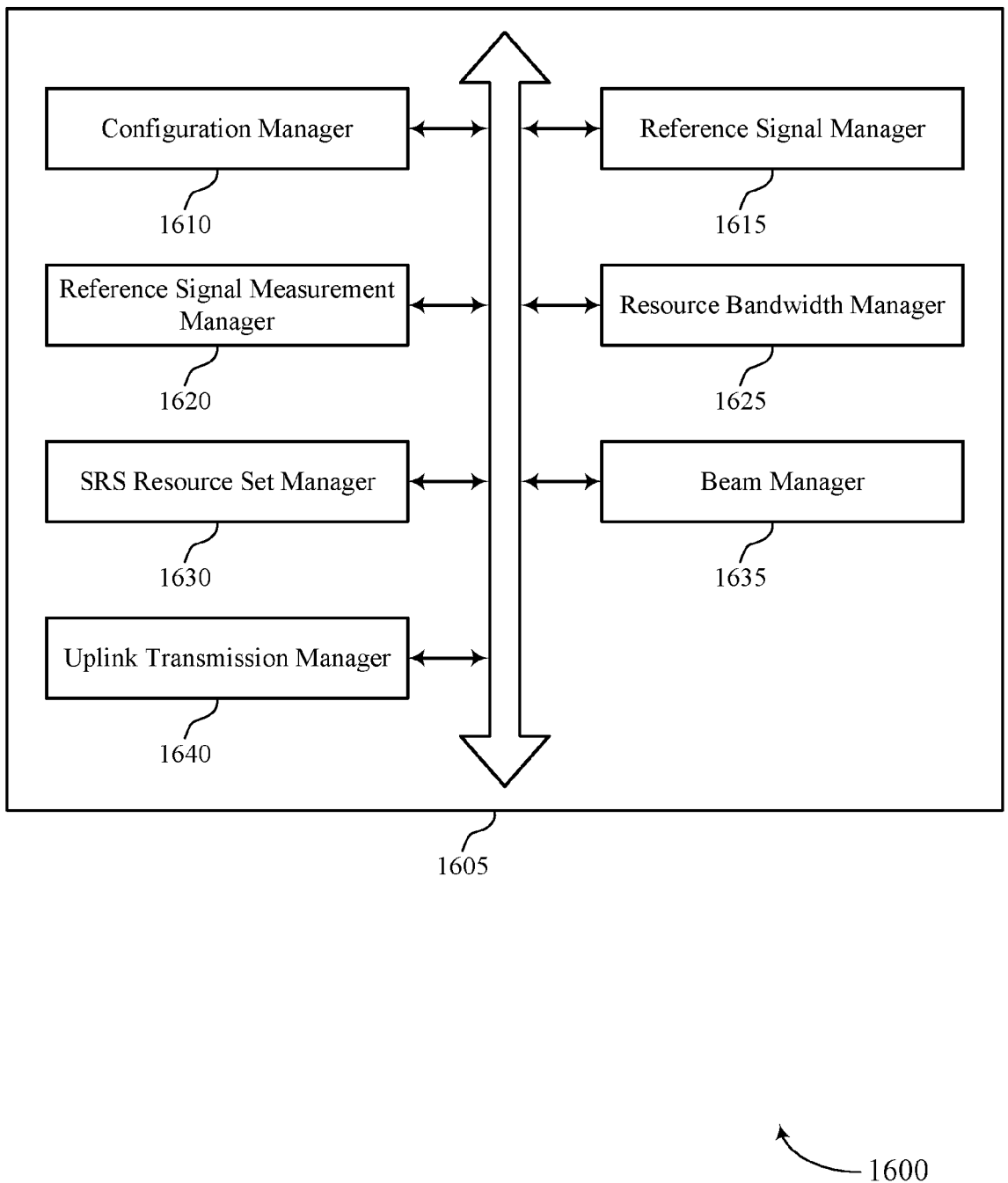
FIG. 16 shows a block diagram of a communications manager that supports uplink reference signal techniques for non-codebook-based wireless communications in accordance with aspects of the present disclosure.

FIG. 16 shows a block diagram 1600 of a communications manager 1605 that supports uplink reference signal techniques for non-codebook-based wireless communications in accordance with aspects of the present disclosure. The communications manager 1605 may be an example of aspects of a communications manager 1415, a communications manager 1515, or a communications manager 1710 described herein. The communications manager 1605 may include a configuration manager 1610, a reference signal manager 1615, a reference signal measurement manager 1620, a resource bandwidth manager 1625, a SRS resource set manager 1630, a beam manager 1635, and an uplink transmission manager 1640. Each of these modules may communicate, directly or indirectly, with one another (e.g., via one or more buses).

The configuration manager 1610 may configure a UE to transmit uplink communications based on calculated precoding parameters from measurements of a downlink reference signal in a first resource bandwidth of a first bandwidth part of a channel bandwidth, where the uplink communications include an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth.

The reference signal manager 1615 may transmit the downlink reference signal to the UE in the first resource bandwidth. In some examples, the reference signal manager 1615 may transmit a downlink reference signal to the UE for calculation of precoding parameters for the first uplink reference signal and the first uplink shared channel communication.

The reference signal measurement manager 1620 may receive the uplink reference signal from the UE in each of the one or more reference signal resource sets in the second resource bandwidth of the first bandwidth part.

The beam manager 1635 may transmit, to a UE, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part. In some cases, the uplink transmission control information indicates a first set of spatial domain parameters the first uplink reference signal and a second set of spatial domain parameters for the first uplink shared channel communication that are provided as separate indications for each set of spatial domain parameters, or are provided in an index value that is mapped to a configured table that indicates different sets of spatial domain parameters. The uplink transmission manager 1640 may receive the first uplink reference signal and the first uplink shared channel communication using the associated spatial domain parameters.

The resource bandwidth manager 1625 may receive, from the UE, an uplink shared channel communication associated with the uplink reference signal in the second resource bandwidth. In some examples, resources for the first uplink shared channel communication occupy non-contiguous frequency resources within the first resource bandwidth or the second resource bandwidth, and separate spatial domain parameters are used for different portions of the non-contiguous frequency resources. In some cases, the downlink reference signal is transmitted in contiguous or non-contiguous frequency domain resources within the first resource bandwidth. In some cases, the uplink shared channel communication and the uplink reference signal have fully or partially overlapping frequency domain resources. In some cases, the second resource bandwidth and the third resource bandwidth are in a same bandwidth part of the channel bandwidth. In some cases, an uplink grant provides separate resource bandwidth indices for the uplink shared channel communication and the uplink reference signal. In some cases, the uplink grant includes separate indications for each of the separate resource bandwidth indices, or an index value that is mapped to a configured table that provides the separate resource bandwidth indices for the uplink shared channel communication and the uplink reference signal. In some cases, the downlink reference signal occupies contiguous or non-contiguous frequency domain resources within the first resource bandwidth.

The SRS resource set manager 1630 may transmit, to the UE, an uplink grant that includes an indication of the one or more reference signal resource sets in the second resource bandwidth, an indication of an index value associated with the second resource bandwidth, and uplink shared channel information for the second resource bandwidth. In some examples, the SRS resource set manager 1630 may transmit, to the UE, an uplink grant that includes an indication of the one or more reference signal resource sets in the second resource bandwidth, an indication of a first index value associated with the second resource bandwidth, and uplink shared channel information for a third resource bandwidth that is different than the second resource bandwidth. In some cases, the one or more reference signal resource sets fully or partially overlap frequency domain resources of the downlink reference signal.

In some cases, the indication of the one or more reference signal resource sets indicates SRS resources that are defined within the second resource bandwidth. In some cases, a set of uplink reference signal resource sets within the second resource bandwidth are indicated by the uplink grant, and where the indication of the one or more reference signal resource sets is provided in a bit field that has separate bits to indicate each uplink reference signal resource set, or in a bit field that indicates each uplink reference signal resource set spans a same amount of resources. In some cases, the uplink grant provides the first index value associated with the second resource bandwidth for the one or more reference signal resource sets and a second index value associated with the third resource bandwidth. In some cases, the first index value is mapped to the one or more reference signal resource sets of the second resource bandwidth. In some cases, an uplink grant provides separate reference signal resources for each of the one or more reference signal resource sets. In some cases, an uplink grant includes separate indications for each reference signal resource set, or an index value that is mapped to a configured table that provides different combinations of reference signal resources for each uplink reference signal resource set. In some cases, the first uplink reference signal fully or partially overlaps frequency domain resources of the downlink reference signal.

Figure 17:
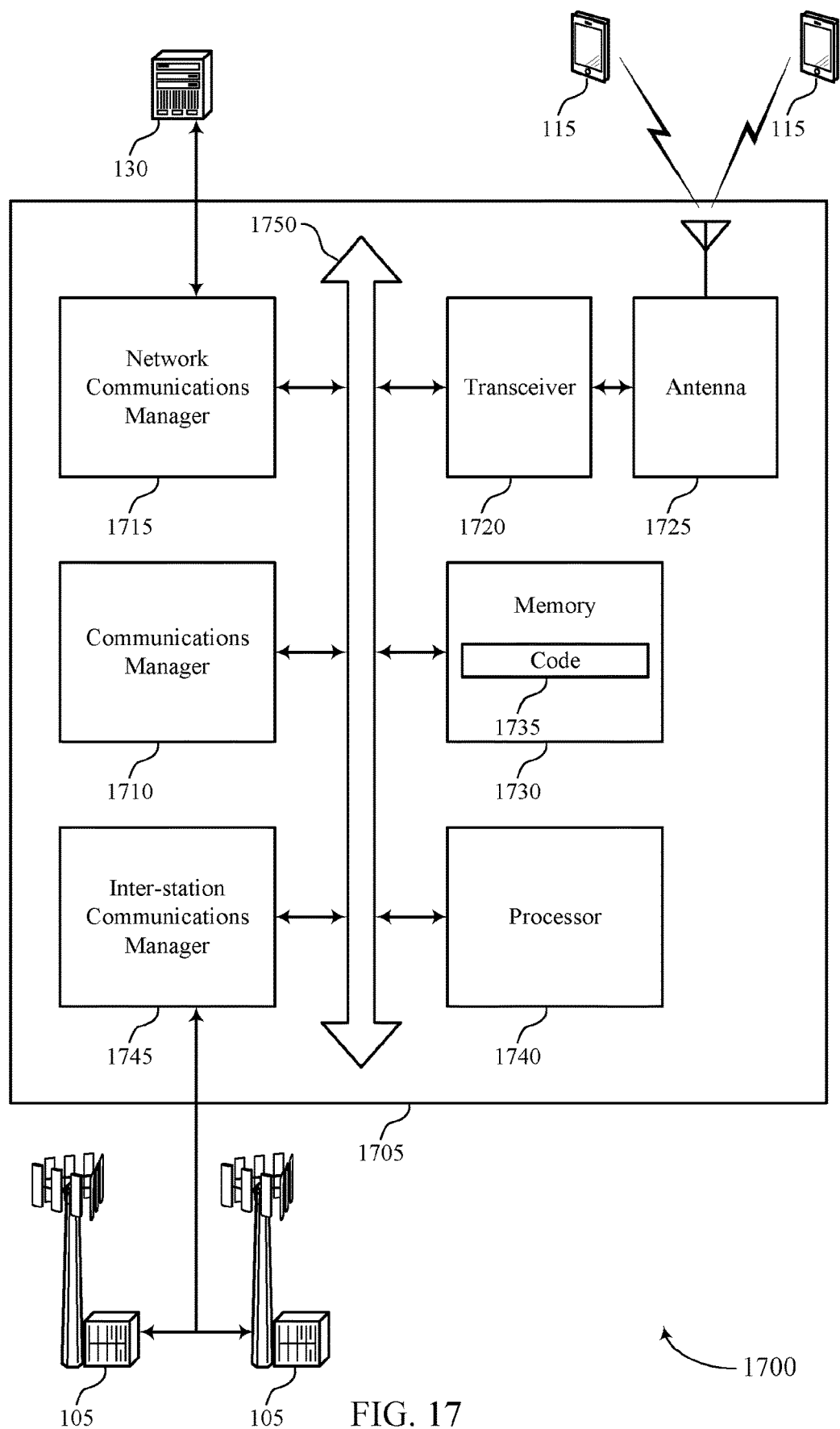
FIG. 17 shows a diagram of a system including a device that supports uplink reference signal techniques for non-codebook-based wireless communications in accordance with aspects of the present disclosure.

FIG. 17 shows a diagram of a system 1700 including a device 1705 that supports uplink reference signal techniques for non-codebook-based wireless communications in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may configure a UE to transmit uplink communications based on calculated precoding parameters from measurements of a downlink reference signal in a first resource bandwidth of a first bandwidth part of a channel bandwidth, where the uplink communications include an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth, transmit the downlink reference signal to the UE in the first resource bandwidth, and receive the uplink reference signal from the UE in each of the one or more reference signal resource sets in the second resource bandwidth of the first bandwidth part.

The communications manager 1710 may also transmit, to a UE, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part, transmit a downlink reference signal to the UE for calculation of precoding parameters for the first uplink reference signal and the first uplink shared channel communication, and receive the first uplink reference signal and the first uplink shared channel communication using the associated spatial domain parameters.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting uplink reference signal techniques for non-codebook-based wireless communications).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
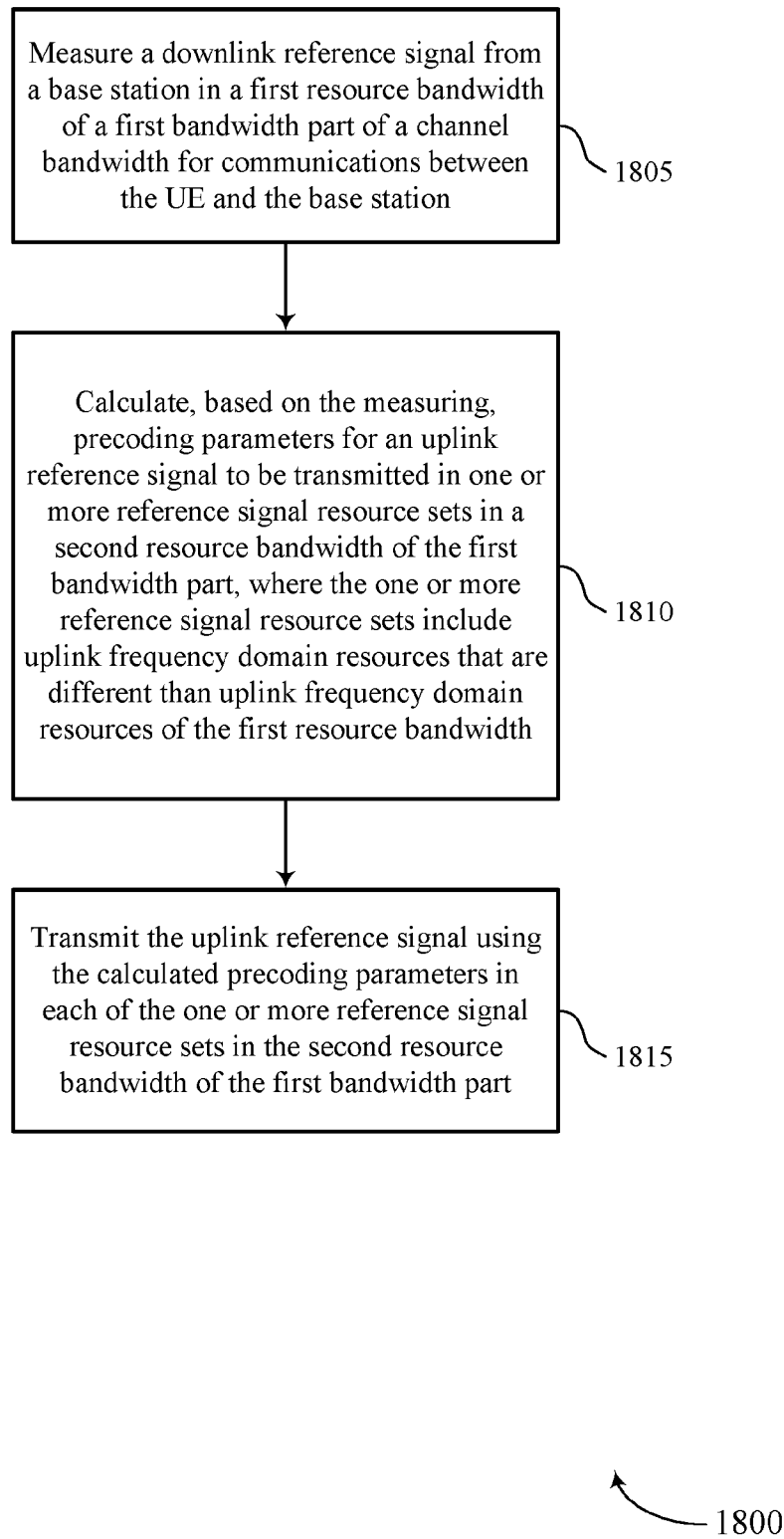
FIGS. 18 through 23 show flowcharts illustrating methods that support uplink reference signal techniques for non-codebook-based wireless communications in accordance with aspects of the present disclosure.

FIG. 18 shows a flowchart illustrating a method 1800 that supports uplink reference signal techniques for non-codebook-based wireless communications in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may measure a downlink reference signal from a base station in a first resource bandwidth of a first bandwidth part of a channel bandwidth for communications between the UE and the base station. The operations of 1805 may be performed according to the methods described herein. In some examples, aspects of the operations of 1805 may be performed by a reference signal measurement manager as described with reference to FIGS. 10 through 13.

At 1810, the UE may calculate, based on the measuring, precoding parameters for an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth. The operations of 1810 may be performed according to the methods described herein. In some examples, aspects of the operations of 1810 may be performed by a precoding manager as described with reference to FIGS. 10 through 13.

At 1815, the UE may transmit the uplink reference signal using the calculated precoding parameters in each of the one or more reference signal resource sets in the second resource bandwidth of the first bandwidth part. The operations of 1815 may be performed according to the methods described herein. In some examples, aspects of the operations of 1815 may be performed by an uplink transmission manager as described with reference to FIGS. 10 through 13.

Figure 19:
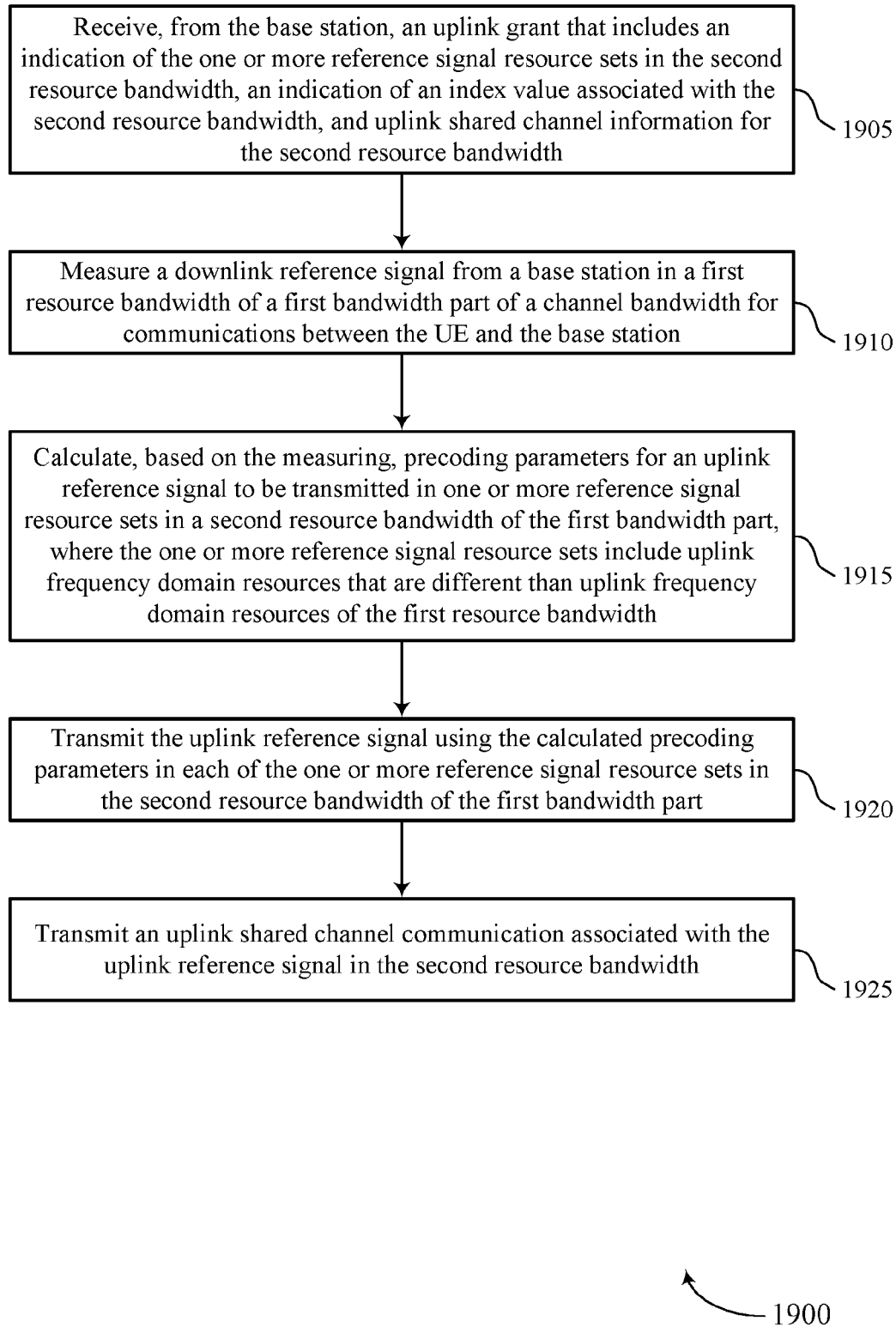

FIG. 19 shows a flowchart illustrating a method 1900 that supports uplink reference signal techniques for non-codebook-based wireless communications in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may receive, from the base station, an uplink grant that includes an indication of the one or more reference signal resource sets in the second resource bandwidth, an indication of an index value associated with the second resource bandwidth, and uplink shared channel information for the second resource bandwidth. The operations of 1905 may be performed according to the methods described herein. In some examples, aspects of the operations of 1905 may be performed by a SRS resource set manager as described with reference to FIGS. 10 through 13.

At 1910, the UE may measure a downlink reference signal from a base station in a first resource bandwidth of a first bandwidth part of a channel bandwidth for communications between the UE and the base station. The operations of 1910 may be performed according to the methods described herein. In some examples, aspects of the operations of 1910 may be performed by a reference signal measurement manager as described with reference to FIGS. 10 through 13.

At 1915, the UE may calculate, based on the measuring, precoding parameters for an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth. The operations of 1915 may be performed according to the methods described herein. In some examples, aspects of the operations of 1915 may be performed by a precoding manager as described with reference to FIGS. 10 through 13.

At 1920, the UE may transmit the uplink reference signal using the calculated precoding parameters in each of the one or more reference signal resource sets in the second resource bandwidth of the first bandwidth part. The operations of 1920 may be performed according to the methods described herein. In some examples, aspects of the operations of 1920 may be performed by an uplink transmission manager as described with reference to FIGS. 10 through 13.

At 1925, the UE may transmit an uplink shared channel communication associated with the uplink reference signal in the second resource bandwidth. The operations of 1925 may be performed according to the methods described herein. In some examples, aspects of the operations of 1925 may be performed by a resource bandwidth manager as described with reference to FIGS. 10 through 13.

Figure 20:
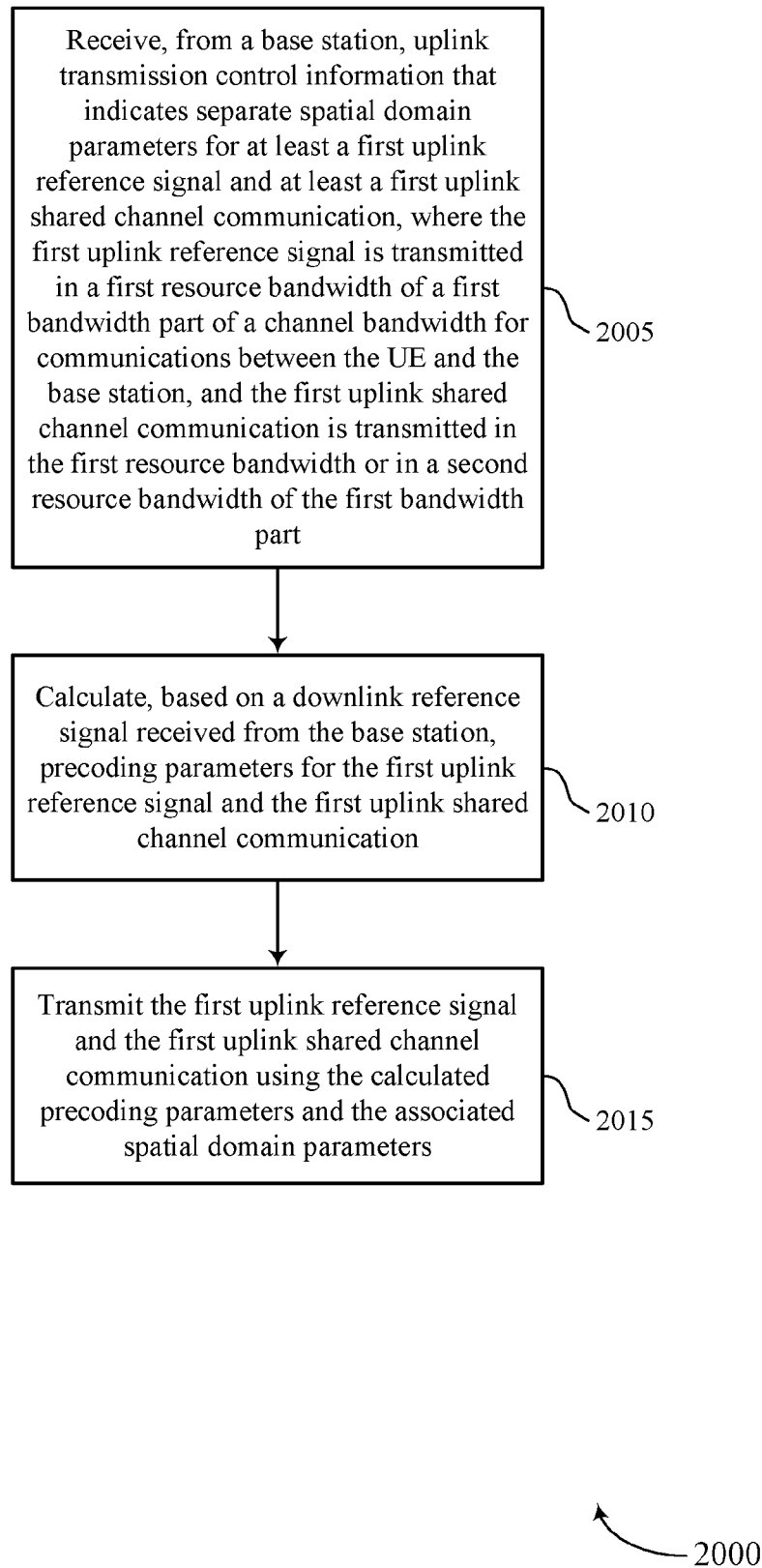

FIG. 20 shows a flowchart illustrating a method 2000 that supports uplink reference signal techniques for non-codebook-based wireless communications in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part. The operations of 2005 may be performed according to the methods described herein. In some examples, aspects of the operations of 2005 may be performed by a beam manager as described with reference to FIGS. 10 through 13.

At 2010, the UE may calculate, based on a downlink reference signal received from the base station, precoding parameters for the first uplink reference signal and the first uplink shared channel communication. The operations of 2010 may be performed according to the methods described herein. In some examples, aspects of the operations of 2010 may be performed by a precoding manager as described with reference to FIGS. 10 through 13.

At 2015, the UE may transmit the first uplink reference signal and the first uplink shared channel communication using the calculated precoding parameters and the associated spatial domain parameters. The operations of 2015 may be performed according to the methods described herein. In some examples, aspects of the operations of 2015 may be performed by an uplink transmission manager as described with reference to FIGS. 10 through 13.

Figure 21:
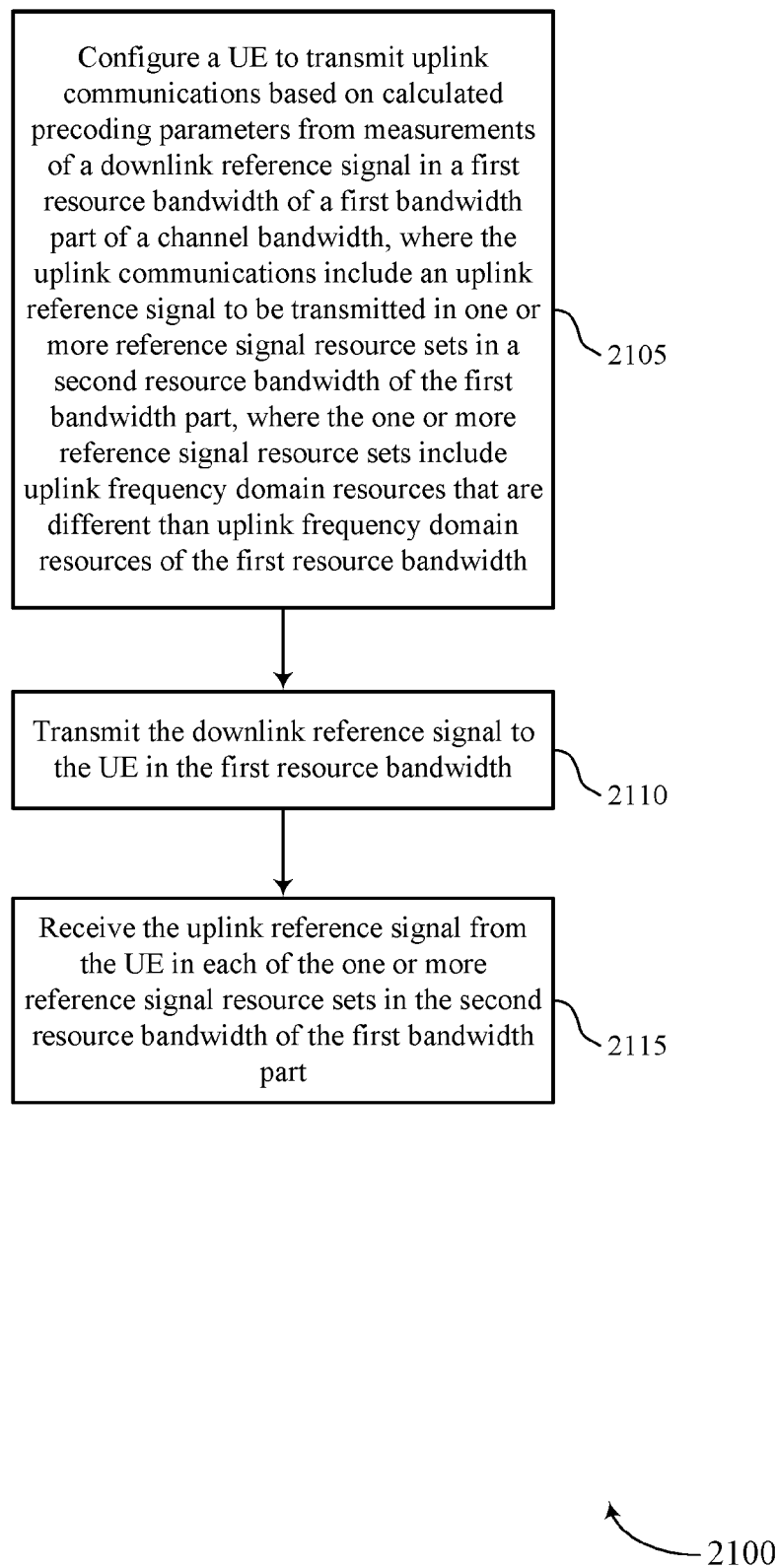

FIG. 21 shows a flowchart illustrating a method 2100 that supports uplink reference signal techniques for non-codebook-based wireless communications in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may configure a UE to transmit uplink communications based on calculated precoding parameters from measurements of a downlink reference signal in a first resource bandwidth of a first bandwidth part of a channel bandwidth, where the uplink communications include an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth. The operations of 2105 may be performed according to the methods described herein. In some examples, aspects of the operations of 2105 may be performed by a configuration manager as described with reference to FIGS. 14 through 17.

At 2110, the base station may transmit the downlink reference signal to the UE in the first resource bandwidth. The operations of 2110 may be performed according to the methods described herein. In some examples, aspects of the operations of 2110 may be performed by a reference signal manager as described with reference to FIGS. 14 through 17.

At 2115, the base station may receive the uplink reference signal from the UE in each of the one or more reference signal resource sets in the second resource bandwidth of the first bandwidth part. The operations of 2115 may be performed according to the methods described herein. In some examples, aspects of the operations of 2115 may be performed by a reference signal measurement manager as described with reference to FIGS. 14 through 17.

Figure 22:
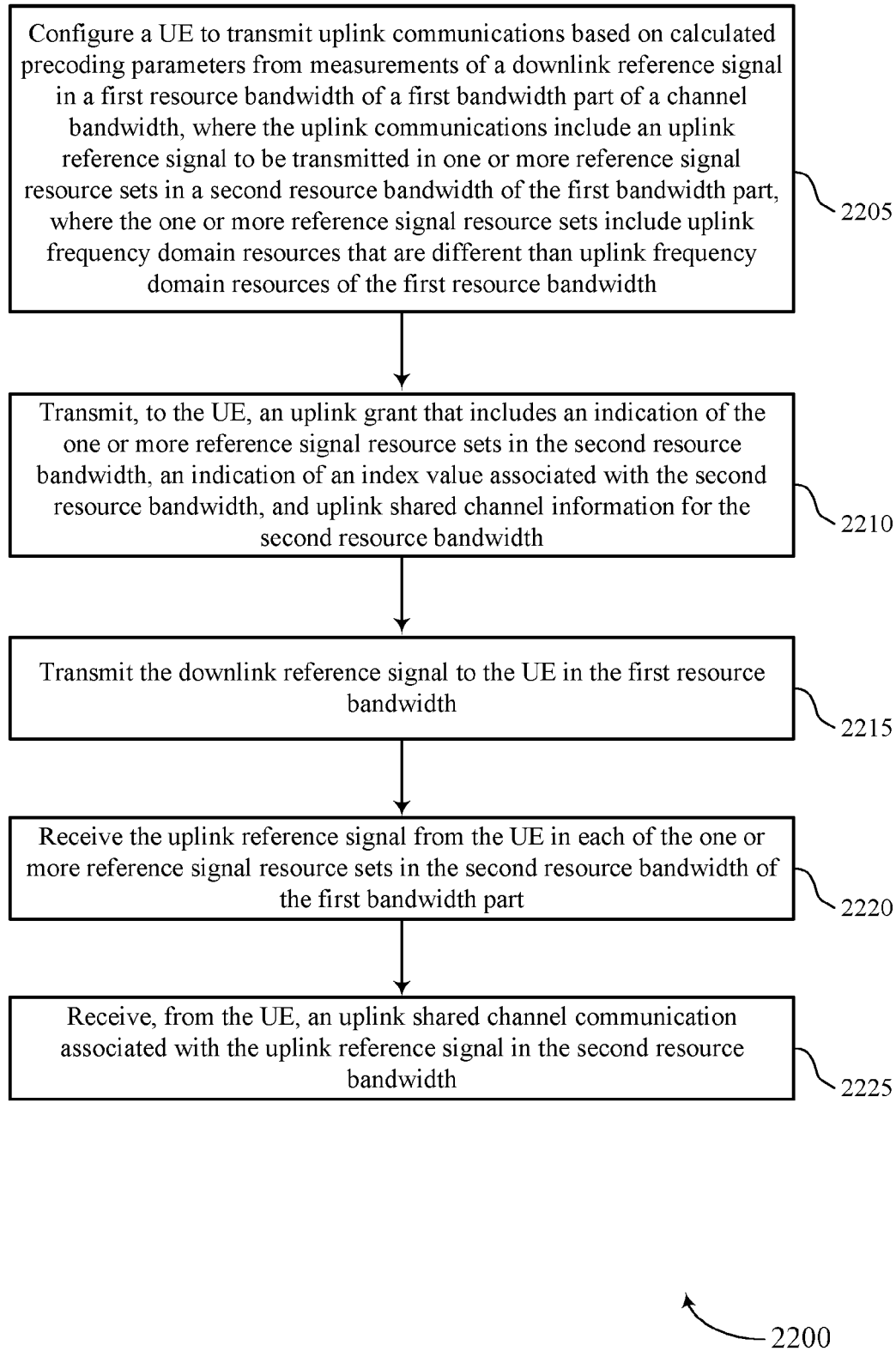

FIG. 22 shows a flowchart illustrating a method 2200 that supports uplink reference signal techniques for non-codebook-based wireless communications in accordance with aspects of the present disclosure. The operations of method 2200 may be implemented by a base station 105 or its components as described herein. For example, the operations of method 2200 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2205, the base station may configure a UE to transmit uplink communications based on calculated precoding parameters from measurements of a downlink reference signal in a first resource bandwidth of a first bandwidth part of a channel bandwidth, where the uplink communications include an uplink reference signal to be transmitted in one or more reference signal resource sets in a second resource bandwidth of the first bandwidth part, where the one or more reference signal resource sets include uplink frequency domain resources that are different than uplink frequency domain resources of the first resource bandwidth. The operations of 2205 may be performed according to the methods described herein. In some examples, aspects of the operations of 2205 may be performed by a configuration manager as described with reference to FIGS. 14 through 17.

At 2210, the base station may transmit, to the UE, an uplink grant that includes an indication of the one or more reference signal resource sets in the second resource bandwidth, an indication of an index value associated with the second resource bandwidth, and uplink shared channel information for the second resource bandwidth. The operations of 2210 may be performed according to the methods described herein. In some examples, aspects of the operations of 2210 may be performed by a SRS resource set manager as described with reference to FIGS. 14 through 17.

At 2215, the base station may transmit the downlink reference signal to the UE in the first resource bandwidth. The operations of 2215 may be performed according to the methods described herein. In some examples, aspects of the operations of 2215 may be performed by a reference signal manager as described with reference to FIGS. 14 through 17.

At 2220, the base station may receive the uplink reference signal from the UE in each of the one or more reference signal resource sets in the second resource bandwidth of the first bandwidth part. The operations of 2220 may be performed according to the methods described herein. In some examples, aspects of the operations of 2220 may be performed by a reference signal measurement manager as described with reference to FIGS. 14 through 17.

At 2225, the base station may receive, from the UE, an uplink shared channel communication associated with the uplink reference signal in the second resource bandwidth. The operations of 2225 may be performed according to the methods described herein. In some examples, aspects of the operations of 2225 may be performed by a resource bandwidth manager as described with reference to FIGS. 14 through 17.

Figure 23:
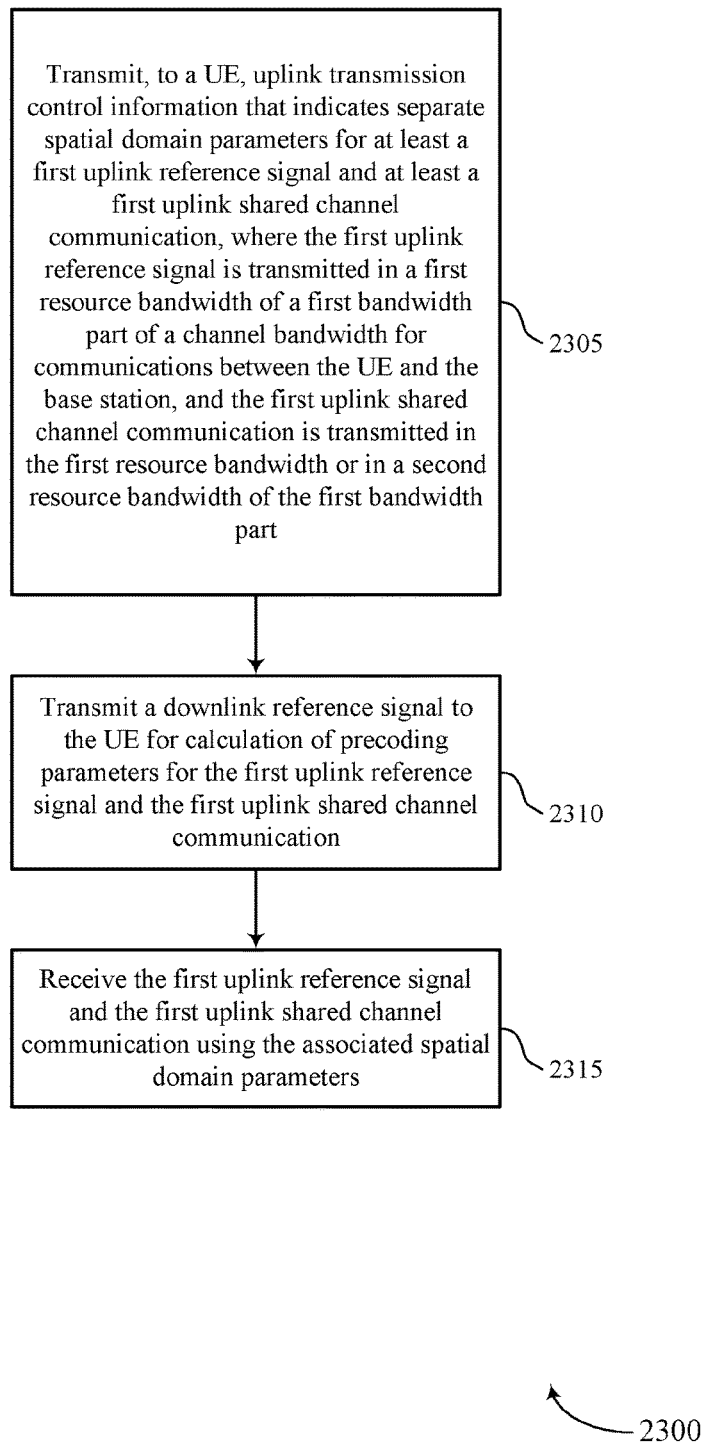

FIG. 23 shows a flowchart illustrating a method 2300 that supports uplink reference signal techniques for non-codebook-based wireless communications in accordance with aspects of the present disclosure. The operations of method 2300 may be implemented by a base station 105 or its components as described herein. For example, the operations of method 2300 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE, uplink transmission control information that indicates separate spatial domain parameters for at least a first uplink reference signal and at least a first uplink shared channel communication, where the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part. The operations of 2305 may be performed according to the methods described herein. In some examples, aspects of the operations of 2305 may be performed by a beam manager as described with reference to FIGS. 14 through 17.

At 2310, the base station may transmit a downlink reference signal to the UE for calculation of precoding parameters for the first uplink reference signal and the first uplink shared channel communication. The operations of 2310 may be performed according to the methods described herein. In some examples, aspects of the operations of 2310 may be performed by a reference signal manager as described with reference to FIGS. 14 through 17.

At 2315, the base station may receive the first uplink reference signal and the first uplink shared channel communication using the associated spatial domain parameters. The operations of 2315 may be performed according to the methods described herein. In some examples, aspects of the operations of 2315 may be performed by an uplink transmission manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: measuring a downlink reference signal from a base station in a first resource bandwidth of a first bandwidth part of a channel bandwidth for communications between the UE and the base station; calculating, based at least in part on the measuring, precoding parameters for an uplink reference signal to be transmitted in one or more reference signal resource sets in a second resource bandwidth of the first bandwidth part, wherein the one or more reference signal resource sets include uplink frequency domain resources that are different than uplink frequency domain resources of the first resource bandwidth; and transmitting the uplink reference signal using the calculated precoding parameters in each of the one or more reference signal resource sets in the second resource bandwidth of the first bandwidth part.

Aspect 2: The method of aspect 1, wherein the measuring further comprises: measuring the downlink reference signal in contiguous or non-contiguous frequency domain resources within the first resource bandwidth.

Aspect 3: The method of any of aspects 1 through 2, wherein the one or more reference signal resource sets fully or partially overlap frequency domain resources of the downlink reference signal.

Aspect 4: The method of any of aspects 1 through 3, further comprising: transmitting an uplink shared channel communication associated with the uplink reference signal in the second resource bandwidth.

Aspect 5: The method of aspect 4, further comprising: receiving, from the base station, an uplink grant that includes an indication of the one or more reference signal resource sets in the second resource bandwidth, an indication of an index value associated with the second resource bandwidth, and uplink shared channel information for the second resource bandwidth.

Aspect 6: The method of aspect 5, wherein the indication of the one or more reference signal resource sets indicates SRS resources that are defined within the second resource bandwidth.

Aspect 7: The method of any of aspects 5 through 6, wherein a plurality of uplink reference signal resource sets within the second resource bandwidth are indicated by the uplink grant, and the indication of the one or more reference signal resource sets is provided in a bit field that has separate bits to indicate each uplink reference signal resource set, or in a bit field that indicates each uplink reference signal resource set spans a same amount of resources.

Aspect 8: The method of aspect 4, further comprising: receiving, from the base station, an uplink grant that includes an indication of the one or more reference signal resource sets in the second resource bandwidth, an indication of a first index value associated with the second resource bandwidth, and uplink shared channel information for a third resource bandwidth that is different than the second resource bandwidth.

Aspect 9: The method of aspect 8, wherein the uplink grant provides the first index value associated with the second resource bandwidth for the one or more reference signal resource sets and a second index value associated with the third resource bandwidth.

Aspect 10: The method of aspect 9, wherein the first index value is mapped to the one or more reference signal resource sets of the second resource bandwidth.

Aspect 11: The method of any of aspects 8 through 10, wherein the uplink shared channel communication and the uplink reference signal have fully or partially overlapping frequency domain resources.

Aspect 12: The method of any of aspects 8 through 11, wherein the second resource bandwidth and the third resource bandwidth are in a same bandwidth part of the channel bandwidth.

Aspect 13: The method of any of aspects 8 through 12, wherein a plurality of uplink reference signal resource sets within the second resource bandwidth are indicated by the uplink grant that provides the uplink shared channel information for the third resource bandwidth that is different than the second resource bandwidth, and the indication of the one or more reference signal resource sets is provided in a bit field that has separate bits to indicate each uplink reference signal resource set, or in a bit field that indicates each uplink reference signal resource set spans a same amount of resources.

Aspect 14: The method of aspect 4, wherein an uplink grant provides separate resource bandwidth indices for the uplink shared channel communication and the uplink reference signal.

Aspect 15: The method of aspect 14, wherein the uplink grant includes separate indications for each of the separate resource bandwidth indices, or an index value that is mapped to a configured table that provides the separate resource bandwidth indices for the uplink shared channel communication and the uplink reference signal.

Aspect 16: The method of aspect 4, wherein an uplink grant provides separate reference signal resources for each of the one or more reference signal resource sets.

Aspect 17: The method of any of aspects 1 through 4, wherein an uplink grant includes separate indications for each reference signal resource set, or an index value that is mapped to a configured table that provides different combinations of reference signal resources for each uplink reference signal resource set.

Aspect 18: A method for wireless communication at a UE, comprising: receiving, from a base station, uplink transmission control information that indicates separate spatial domain filters for at least a first uplink reference signal and at least a first uplink shared channel communication, wherein the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part; calculating, based at least in part on a downlink reference signal received from the base station, precoding parameters for the first uplink reference signal and the first uplink shared channel communication; and transmitting the first uplink reference signal and the first uplink shared channel communication using the calculated precoding parameters and the associated spatial domain filter.

Aspect 19: The method of aspect 18, wherein the uplink transmission control information includes a first transmission configuration indicator (TCI) state that indicates a first set of spatial domain parameters for the first uplink reference signal and a second TCI state that indicates a second set of spatial domain parameters for the first uplink shared channel communication, and the spatial domain parameters are provided as separate indications for each set of spatial domain parameters, or are provided in an index value that is mapped to a configured table that indicates different sets of spatial domain parameters.

Aspect 20: The method of any of aspects 18 through 19, wherein resources for the first uplink shared channel communication occupy non-contiguous frequency resources within the first resource bandwidth or the second resource bandwidth, and separate spatial domain parameters are used for different portions of the non-contiguous frequency resources.

Aspect 21: The method of any of aspects 18 through 20, wherein the downlink reference signal occupies contiguous or non-contiguous frequency domain resources within the first resource bandwidth.

Aspect 22: The method of any of aspects 18 through 21, wherein the first uplink reference signal fully or partially overlaps frequency domain resources of the downlink reference signal.

Aspect 23: A method for wireless communication at a base station, comprising: configuring a UE to transmit uplink communications based at least in part on calculated precoding parameters from measurements of a downlink reference signal in a first resource bandwidth of a first bandwidth part of a channel bandwidth, wherein the uplink communications include an uplink reference signal to be transmitted in one or more reference signal resource sets in a second resource bandwidth of the first bandwidth part, wherein the one or more reference signal resource sets include uplink frequency domain resources that are different than uplink frequency domain resources of the first resource bandwidth; transmitting the downlink reference signal to the UE in the first resource bandwidth; and receiving the uplink reference signal from the UE in each of the one or more reference signal resource sets in the second resource bandwidth of the first bandwidth part.

Aspect 24: The method of aspect 23, wherein the downlink reference signal is transmitted in contiguous or non-contiguous frequency domain resources within the first resource bandwidth.

Aspect 25: The method of any of aspects 23 through 24, wherein the one or more reference signal resource sets fully or partially overlap frequency domain resources of the downlink reference signal.

Aspect 26: The method of any of aspects 23 through 25, further comprising: receiving, from the UE, an uplink shared channel communication associated with the uplink reference signal in the second resource bandwidth.

Aspect 27: The method of aspect 26, further comprising: transmitting, to the UE, an uplink grant that includes an indication of the one or more reference signal resource sets in the second resource bandwidth, an indication of an index value associated with the second resource bandwidth, and uplink shared channel information for the second resource bandwidth.

Aspect 28: The method of aspect 27, wherein the indication of the one or more reference signal resource sets indicates SRS resources that are defined within the second resource bandwidth.

Aspect 29: The method of any of aspects 27 through 28, wherein a plurality of uplink reference signal resource sets within the second resource bandwidth are indicated by the uplink grant, and the indication of the one or more reference signal resource sets is provided in a bit field that has separate bits to indicate each uplink reference signal resource set, or in a bit field that indicates each uplink reference signal resource set spans a same amount of resources.

Aspect 30: The method of aspect 26, further comprising: transmitting, to the UE, an uplink grant that includes an indication of the one or more reference signal resource sets in the second resource bandwidth, an indication of a first index value associated with the second resource bandwidth, and uplink shared channel information for a third resource bandwidth that is different than the second resource bandwidth.

Aspect 31: The method of aspect 30, wherein the uplink grant provides the first index value associated with the second resource bandwidth for the one or more reference signal resource sets and a second index value associated with the third resource bandwidth.

Aspect 32: The method of aspect 31, wherein the first index value is mapped to the one or more reference signal resource sets of the second resource bandwidth.

Aspect 33: The method of any of aspects 30 through 32, wherein the uplink shared channel communication and the uplink reference signal have fully or partially overlapping frequency domain resources.

Aspect 34: The method of any of aspects 30 through 33, wherein the second resource bandwidth and the third resource bandwidth are in a same bandwidth part of the channel bandwidth.

Aspect 35: The method of any of aspects 30 through 34, wherein a plurality of uplink reference signal resource sets within the second resource bandwidth are indicated by the uplink grant, and the indication of the one or more reference signal resource sets is provided in a bit field that has separate bits to indicate each uplink reference signal resource set, or in a bit field that indicates each uplink reference signal resource set spans a same amount of resources.

Aspect 36: The method of aspect 26, wherein an uplink grant provides separate resource bandwidth indices for the uplink shared channel communication and the uplink reference signal.

Aspect 37: The method of aspect 36, wherein the uplink grant includes separate indications for each of the separate resource bandwidth indices, or an index value that is mapped to a configured table that provides the separate resource bandwidth indices for the uplink shared channel communication and the uplink reference signal.

Aspect 38: The method of aspect 26, wherein an uplink grant provides separate reference signal resources for each of the one or more reference signal resource sets.

Aspect 39: The method of any of aspects 23 through 26, wherein an uplink grant includes separate indications for each reference signal resource set, or an index value that is mapped to a configured table that provides different combinations of reference signal resources for each uplink reference signal resource set.

Aspect 40: A method for wireless communication at a base station, comprising: transmitting, to a UE, uplink transmission control information that indicates separate spatial domain filters for at least a first uplink reference signal and at least a first uplink shared channel communication, wherein the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part; transmitting a downlink reference signal to the UE for calculation of precoding parameters for the first uplink reference signal and the first uplink shared channel communication; and receiving the first uplink reference signal and the first uplink shared channel communication using the associated spatial domain filters.

Aspect 41: The method of aspect 40, wherein the uplink transmission control information indicates a first set of spatial domain parameters the first uplink reference signal and a second set of spatial domain parameters for the first uplink shared channel communication that are provided as separate indications for each set of spatial domain parameters, or are provided in an index value that is mapped to a configured table that indicates different sets of spatial domain parameters.

Aspect 42: The method of any of aspects 40 through 41, wherein resources for the first uplink shared channel communication occupy non-contiguous frequency resources within the first resource bandwidth or the second resource bandwidth, and separate spatial domain parameters are used for different portions of the non-contiguous frequency resources.

Aspect 43: The method of any of aspects 40 through 42, wherein the downlink reference signal occupies contiguous or non-contiguous frequency domain resources within the first resource bandwidth.

Aspect 44: The method of any of aspects 40 through 43, wherein the first uplink reference signal fully or partially overlaps frequency domain resources of the downlink reference signal.

Aspect 45: An apparatus for wireless communication at a UE, comprising a processor; memory coupled with the processor; and instructions stored in the memory and executable by the processor to cause the apparatus to perform a method of any of aspects 1 through 17.

Aspect 46: An apparatus for wireless communication at a UE, comprising at least one means for performing a method of any of aspects 1 through 17.

Aspect 47: A non-transitory computer-readable medium storing code for wireless communication at a UE, the code comprising instructions executable by a processor to perform a method of any of aspects 1 through 17.

Aspect 48: An apparatus for wireless communication at a UE, comprising a processor; memory coupled with the processor; and instructions stored in the memory and executable by the processor to cause the apparatus to perform a method of any of aspects 18 through 22.

Aspect 49: An apparatus for wireless communication at a UE, comprising at least one means for performing a method of any of aspects 18 through 22.

Aspect 50: A non-transitory computer-readable medium storing code for wireless communication at a UE, the code comprising instructions executable by a processor to perform a method of any of aspects 18 through 22.

Aspect 51: An apparatus for wireless communication at a base station, comprising a processor; memory coupled with the processor; and instructions stored in the memory and executable by the processor to cause the apparatus to perform a method of any of aspects 23 through 39.

Aspect 52: An apparatus for wireless communication at a base station, comprising at least one means for performing a method of any of aspects 23 through 39.

Aspect 53: A non-transitory computer-readable medium storing code for wireless communication at a base station, the code comprising instructions executable by a processor to perform a method of any of aspects 23 through 39.

Aspect 54: An apparatus for wireless communication at a base station, comprising a processor; memory coupled with the processor; and instructions stored in the memory and executable by the processor to cause the apparatus to perform a method of any of aspects 40 through 44.

Aspect 55: An apparatus for wireless communication at a base station, comprising at least one means for performing a method of any of aspects 40 through 44.

Aspect 56: A non-transitory computer-readable medium storing code for wireless communication at a base station, the code comprising instructions executable by a processor to perform a method of any of aspects 40 through 44.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
  measuring a downlink reference signal from a base station in a first resource bandwidth of a first bandwidth part of a channel bandwidth for communications between the UE and the base station;
  calculating, based at least in part on the measuring, precoding parameters for an uplink reference signal to be transmitted in one or more reference signal resource sets in a second resource bandwidth of the first bandwidth part, wherein the one or more reference signal resource sets include uplink frequency domain resources that are different than uplink frequency domain resources of the first resource bandwidth, and wherein the one or more reference signal resource sets fully or partially overlap frequency domain resources of the downlink reference signal; and transmitting the uplink reference signal using the calculated precoding parameters in each of the one or more reference signal resource sets in the second resource bandwidth of the first bandwidth part.

2. The method of claim 1, wherein the measuring further comprises:
measuring the downlink reference signal in contiguous or non-contiguous frequency domain resources within the first resource bandwidth.

3. The method of claim 1, further comprising:
transmitting an uplink shared channel communication associated with the uplink reference signal in the second resource bandwidth.

4. The method of claim 3, further comprising:
receiving, from the base station, an uplink grant that includes an indication of the one or more reference signal resource sets in the second resource bandwidth, an indication of an index value associated with the second resource bandwidth, and uplink shared channel information for the second resource bandwidth.

5. The method of claim 4, wherein the indication of the one or more reference signal resource sets indicates sounding reference signal (SRS) resources that are defined within the second resource bandwidth.

6. The method of claim 4, wherein a plurality of uplink reference signal resource sets within the second resource bandwidth are indicated by the uplink grant, and wherein the indication of the one or more reference signal resource sets is provided in a bit field that has separate bits to indicate each uplink reference signal resource set, or in a bit field that indicates each uplink reference signal resource set spans a same amount of resources.

7. The method of claim 3, further comprising:
receiving, from the base station, an uplink grant that includes an indication of the one or more reference signal resource sets in the second resource bandwidth, an indication of a first index value associated with the second resource bandwidth, and uplink shared channel information for a third resource bandwidth that is different than the second resource bandwidth.

8. The method of claim 7, wherein the uplink grant provides the first index value associated with the second resource bandwidth for the one or more reference signal resource sets and a second index value associated with the third resource bandwidth.

9. The method of claim 8, wherein the first index value is mapped to the one or more reference signal resource sets of the second resource bandwidth.

10. The method of claim 7, wherein the uplink shared channel communication and the uplink reference signal have fully or partially overlapping frequency domain resources, and wherein the second resource bandwidth and the third resource bandwidth are in a same bandwidth part of the channel bandwidth.

11. The method of claim 7, wherein a plurality of uplink reference signal resource sets within the second resource bandwidth are indicated by the uplink grant that provides the uplink shared channel information for the third resource bandwidth that is different than the second resource bandwidth, and wherein the indication of the one or more reference signal resource sets is provided in a bit field that has separate bits to indicate each uplink reference signal resource set, or in a bit field that indicates each uplink reference signal resource set spans a same amount of resources.

12. The method of claim 3, wherein an uplink grant provides separate resource bandwidth indices for the uplink shared channel communication and the uplink reference signal.

13. The method of claim 12, wherein the uplink grant includes separate indications for each of the separate resource bandwidth indices, or an index value that is mapped to a configured table that provides the separate resource bandwidth indices for the uplink shared channel communication and the uplink reference signal.

14. The method of claim 1, wherein an uplink grant includes separate indications for each reference signal resource set, or an index value that is mapped to a configured table that provides different combinations of reference signal resources for each uplink reference signal resource set.

15. A method for wireless communication at a user equipment (UE), comprising:
receiving, from a base station, uplink transmission control information that indicates separate spatial domain filters for at least a first uplink reference signal and at least a first uplink shared channel communication, wherein the first uplink reference signal is transmitted in a first resource bandwidth of a first bandwidth part of a channel bandwidth for communications between the UE and the base station, and the first uplink shared channel communication is transmitted in the first resource bandwidth or in a second resource bandwidth of the first bandwidth part;
calculating, based at least in part on a downlink reference signal received from the base station, precoding parameters for the first uplink reference signal and the first uplink shared channel communication, wherein the first uplink reference signal fully or partially overlaps frequency domain resources of the downlink reference signal; and
transmitting the first uplink reference signal and the first uplink shared channel communication using the calculated precoding parameters and the associated spatial domain filter.

16. The method of claim 15, wherein the uplink transmission control information includes a first transmission configuration indicator (TCI) state that indicates a first set of spatial domain parameters for the first uplink reference signal and a second TCI state that indicates a second set of spatial domain parameters for the first uplink shared channel communication, and wherein the spatial domain parameters are provided as separate indications for each set of spatial domain parameters, or are provided in an index value that is mapped to a configured table that indicates different sets of spatial domain parameters.

17. The method of claim 15, wherein:
resources for the first uplink shared channel communication occupy non-contiguous frequency resources within the first resource bandwidth or the second resource bandwidth, and separate spatial domain parameters are used for different portions of the non-contiguous frequency resources, and wherein
the downlink reference signal occupies contiguous or non-contiguous frequency domain resources within the first resource bandwidth.

18. A method for wireless communication at a base station, comprising:
configuring a user equipment (UE) to transmit uplink communications based at least in part on calculated precoding parameters from measurements of a downlink reference signal in a first resource bandwidth of a first bandwidth part of a channel bandwidth, wherein the uplink communications include an uplink reference signal to be transmitted in one or more reference signal resource sets in a second resource bandwidth of the first bandwidth part, wherein the one or more reference signal resource sets include uplink frequency domain resources that are different than uplink frequency domain resources of the first resource bandwidth, and wherein the one or more reference signal resource sets fully or partially overlap frequency domain resources of the downlink reference signal;

transmitting the downlink reference signal to the UE in the first resource bandwidth; and receiving the uplink reference signal from the UE in each of the one or more reference signal resource sets in the second resource bandwidth of the first bandwidth part.

19. The method of claim 18, wherein the base station is a full duplex base station, and the downlink reference signal is transmitted in contiguous or non-contiguous frequency domain resources within the first resource bandwidth.

20. The method of claim 18, further comprising:

receiving, from the UE, an uplink shared channel communication associated with the uplink reference signal in the second resource bandwidth.

21. The method of claim 20, further comprising:

transmitting, to the UE, an uplink grant that includes an indication of the one or more reference signal resource sets in the second resource bandwidth, an indication of an index value associated with the second resource bandwidth, and uplink shared channel information for the second resource bandwidth.

22. The method of claim 21, wherein a plurality of uplink reference signal resource sets within the second resource bandwidth are indicated by the uplink grant, and wherein the indication of the one or more reference signal resource sets is provided in a bit field that has separate bits to indicate each uplink reference signal resource set, or in a bit field that indicates each uplink reference signal resource set spans a same amount of resources.

23. The method of claim 20, further comprising:

transmitting, to the UE, an uplink grant that includes an indication of the one or more reference signal resource sets in the second resource bandwidth, an indication of a first index value associated with the second resource bandwidth, and uplink shared channel information for a third resource bandwidth that is different than the second resource bandwidth.

24. The method of claim 18, wherein an uplink grant includes separate indications for each reference signal resource set, or an index value that is mapped to a configured table that provides different combinations of reference signal resources for each uplink reference signal resource set.

25. An apparatus for wireless communication at a user equipment (UE), comprising:

a processor, memory coupled with the processor; and instructions stored in the memory and executable by the processor to cause the apparatus to:

measure a downlink reference signal from a base station in a first resource bandwidth of a first bandwidth part of a channel bandwidth for communications between the UE and the base station;

calculate, based at least in part on the measuring, precoding parameters for an uplink reference signal to be transmitted in one or more reference signal resource sets in a second resource bandwidth of the first bandwidth part, wherein the one or more reference signal resource sets include uplink frequency domain resources that are different than uplink frequency domain resources of the first resource bandwidth, and wherein the one or more reference signal resource sets fully or partially overlap frequency domain resources of the downlink reference signal; and transmit the uplink reference signal using the calculated precoding parameters in each of the one or more reference signal resource sets in the second resource bandwidth of the first bandwidth part.

26. The apparatus of claim 25, wherein the instructions are further executable by the processor to cause the apparatus to:

measure the downlink reference signal in contiguous or non-contiguous frequency domain resources within the first resource bandwidth.

27. The apparatus of claim 25, wherein the instructions are further executable by the processor to cause the apparatus to:

transmit an uplink shared channel communication associated with the uplink reference signal in the second resource bandwidth.

28. The apparatus of claim 27, wherein the instructions are further executable by the processor to cause the apparatus to:

receive, from the base station, an uplink grant that includes an indication of the one or more reference signal resource sets in the second resource bandwidth, an indication of an index value associated with the second resource bandwidth, and uplink shared channel information for the second resource bandwidth.

* * * * *